US009991719B2

(12) United States Patent
Krolak et al.

(10) Patent No.: US 9,991,719 B2
(45) Date of Patent: Jun. 5, 2018

(54) SYSTEMS AND METHODS FOR REDUCING CIRCULATING CURRENT AND PHASE TO PHASE IMBALANCE IN A PARALLEL MODULAR CONVERTER SYSTEM

(71) Applicant: The Boeing Company, Chicago, IL (US)

(72) Inventors: Matthew J. Krolak, Renton, WA (US); Lijun Gao, Renton, WA (US); Shengyi Liu, Sammamish, WA (US)

(73) Assignee: THE BOEING COMPANY, Chicago, IL (US)

(*) Notice: Subject to any disclaimer, the term of this patent is extended or adjusted under 35 U.S.C. 154(b) by 271 days.

(21) Appl. No.: 14/570,165

(22) Filed: Dec. 15, 2014

(65) Prior Publication Data

US 2016/0094040 A1    Mar. 31, 2016

Related U.S. Application Data

(63) Continuation-in-part of application No. 14/502,350, filed on Sep. 30, 2014.

(51) Int. Cl.
*H02J 7/35*       (2006.01)
*H02J 50/50*      (2016.01)
(Continued)

(52) U.S. Cl.
CPC ............ *H02J 4/00* (2013.01); *G05B 19/0421* (2013.01); *H02M 7/493* (2013.01);
(Continued)

(58) Field of Classification Search
CPC ................................ H02J 7/007; H02J 7/0013
See application file for complete search history.

(56) References Cited

U.S. PATENT DOCUMENTS

2007/0259545 A1    11/2007  Berenger
2008/0111421 A1*    5/2008  Anghel .................. H02M 7/81
                                                        307/23
(Continued)

FOREIGN PATENT DOCUMENTS

EP            2763360 A2    8/2014
WO       2014/025734 A2    2/2014
WO       2016033592 A1    3/2016

OTHER PUBLICATIONS

European Search Report for EP15187673, dated Feb. 26, 2016.
International Examination Report for Application 15 187 673.7-1204 dated Feb. 14, 2018.

*Primary Examiner* — Eduardo Colon Santana
*Assistant Examiner* — Charles S Laughlin
(74) *Attorney, Agent, or Firm* — Patterson + Sheridan, LLP

(57) ABSTRACT

A system and method for providing power to a vehicle with reduced circulating current and phase-top-phase imbalance is disclosed. The system can include a plurality of parallel module converter for prioritizing and allocating each electrical load to one or more parallel modular converter modules. The system can also comprise a load balancer to ensure that differences in the properties (e.g., impedance) of the parallel modular converter modules do not create circulating currents or phase-to-phase imbalances. The load balancer can monitor the outputs to the plurality of parallel modular converter modules and modify the inputs to equalize, synchronize, or both the outputs.

20 Claims, 21 Drawing Sheets

(51) Int. Cl.
  *H02J 4/00*    (2006.01)
  *H02P 29/00*   (2016.01)
  *G05B 19/042*   (2006.01)
  *H02M 7/493*   (2007.01)
  *H02M 7/5387*  (2007.01)
  *H02M 1/32*    (2007.01)
  *H02M 5/458*   (2006.01)

(52) U.S. Cl.
  CPC ........ H02M 7/53873 (2013.01); H02P 29/00 (2013.01); *H02M 1/32* (2013.01); *H02M 5/4585* (2013.01); *H02M 2001/325* (2013.01)

(56) References Cited

U.S. PATENT DOCUMENTS

| | | | | |
|---|---|---|---|---|
| 2008/0174966 A1* | 7/2008 | Badger | ................ | H02M 7/003 361/709 |
| 2010/0013419 A1* | 1/2010 | White | ...................... | H02P 5/46 318/51 |
| 2011/0278934 A1* | 11/2011 | Ghosh | .................... | H02J 9/062 307/66 |
| 2014/0217821 A1* | 8/2014 | Rozman | .................... | H02J 1/14 307/29 |
| 2014/0233289 A1* | 8/2014 | Zhao | .................... | H02M 7/5395 363/131 |

* cited by examiner

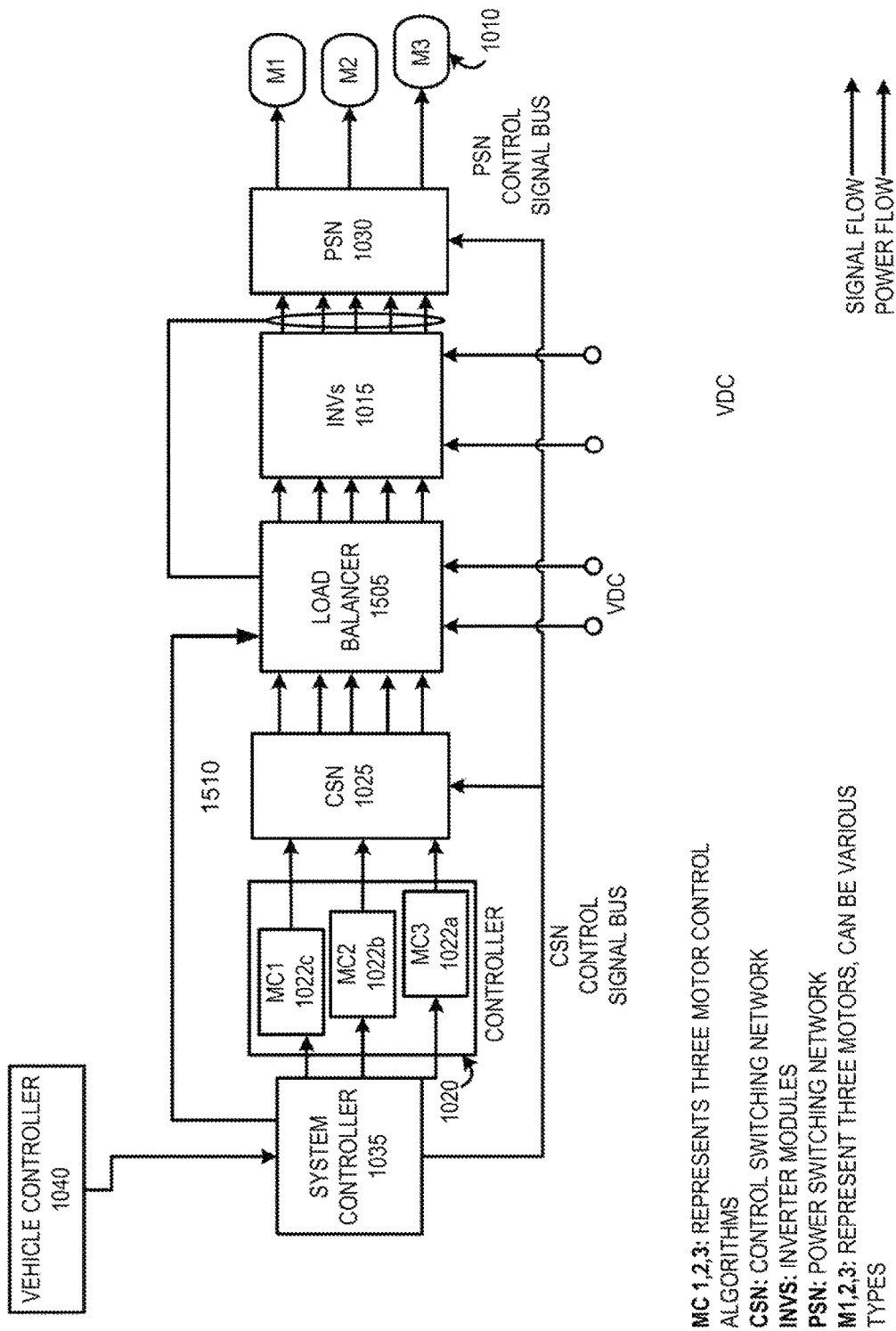

SYSTEMS AND METHODS FOR REDUCING CIRCULATING CURRENT AND PHASE TO PHASE IMBALANCE IN A PARALLEL MODULAR CONVERTER SYSTEM

CROSS-REFERENCE TO RELATED APPLICATIONS AND PRIORITY CLAIM

This application is a continuation-in-part of, and claims benefit under 35 U.S.C. § 120, to U.S. patent application Ser. No. 14/502,350, filed Sep. 30, 2014 and entitled, "Parallel Modular Converter Architecture," the entire contents of which is hereby incorporated by reference as if set forth below in its entirety.

BACKGROUND

1. Field of the Disclosure

Embodiments of the present disclosure relate generally to power management and specifically to a system and method for controlling phase-to-phase imbalances and reducing the circulating current in a parallel modular converter system.

2. Background of Related Art

Modern vehicles use a large number of electronics, motors, heaters, and other electrically driven equipment. Electric motors, in particular, are ubiquitous in modern vehicles, including aircraft, and power everything from hydraulic pumps to cabin fans. Conventionally, each of these electric motors has been driven by an independent motor controller. Each motor controller is sized to be able to carry the maximum amount of current required to power its respective motor at full power for an extended period of time (and generally, includes some additional capacity for safety) without overheating or malfunctioning.

As a result, each aircraft carries an excessive number of motor controllers, each of which is oversized and underutilized a majority of the time. In other words, the motor controller includes enough capacity to run the motor at full power for an extended period of time plus a safety margin, but motors are rarely, if ever, run at full capacity. This is because the motors themselves have some safety margin built in and because, a majority of the time, the motors are operating in a lower demand regime (e.g., the cabin fan is not always on "High"). In addition, some motors are only used occasionally, or during specific flight segments, and are unused the remainder of the time. As a result, many of an aircraft's complement of heavy, expensive motor controllers spend a majority of their service life either inactive or significantly below their rated power outputs.

What is needed, therefore, is a system architecture that enables the use of multiple, modular, assignable, dynamically reconfigurable parallel motor controllers that can work alone or in parallel with other parallel motor controllers to meet power control needs. The system should enable one or more parallel controllers to be assigned to each active electrical load in the aircraft, as necessary, to meet existing power demands. The system should enable the use of such parallel controllers, while minimizing phase-to-phase imbalances and reducing circulating current. It is to such a system that embodiments of the present disclosure are primarily directed.

SUMMARY

It should be appreciated that this Summary is provided to introduce a selection of concepts in a simplified form that are further described below in the Detailed Description. This Summary is not intended to be used to limit the scope of the claimed subject matter.

Embodiments of the present disclosure relate to systems and methods related to a modular power distribution and power conversion system for electrical loads. The system can include a plurality of parallel modular converter modules ("modules") linked to form a parallel modular converter ("converter"). The system and method can operate multiple modules simultaneously and in parallel, while maintaining substantially equal output from each module The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

FIG. 15 is an electrical schematic depicting an overall system architecture for a converter with a load balancer, in accordance with some embodiments of the present disclosure.

Figure 1:
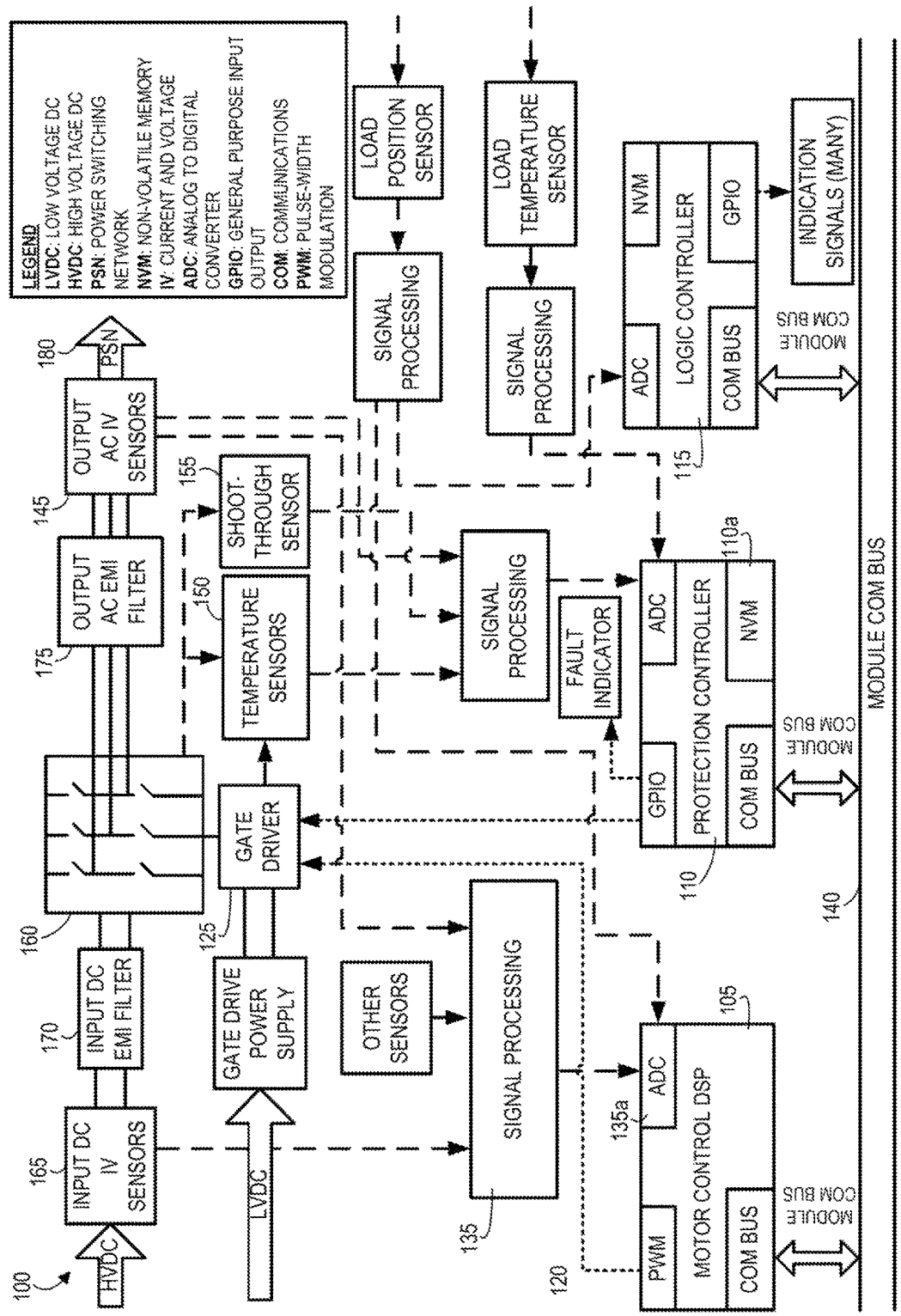
FIG. 1 is an electrical schematic depicting a parallel modular converter module ("module") for use in a parallel modular converter in a high voltage DC input application, in accordance with some embodiments of the present disclosure.

Each figure shown in this disclosure shows a variation of an aspect of the embodiment presented, and only differences will be discussed in detail.

DETAILED DESCRIPTION

Embodiments of the present disclosure relate generally to power distribution and power conversion systems and more particularly to a parallel modular converter for distributing electrical loads without the need for individual controllers at each electrical load. The converter can utilize a load balancer to monitor the inputs and outputs to each parallel modular converter module in the parallel module converter to match the output currents. This can result in reduction of circulating current and phase-to-phase imbalances, among other things.

To simplify and clarify explanation, the disclosure is described herein as a system for allocating power on an aircraft. One skilled in the art will recognize, however, that the disclosure is not so limited. The system can also be used, for example and not limitation, with automobiles, other types of vehicles, and in power distribution networks. The disclosure can be used to improve control and reduce the cost and expense of distributing power in numerous situations by reducing the number of controllers required and eliminating excess controller capacity and reducing, or eliminating circulating current and phase-to-phase imbalances.

The materials and components described hereinafter as making up the various elements of the present disclosure are intended to be illustrative and not restrictive. Many suitable materials and components that would perform the same or a similar function as the materials and components described herein are intended to be embraced within the scope of the disclosure. Such other materials and components not described herein can include, but are not limited to, materials and components that are developed after the time of the development of the disclosure.

As mentioned above, a problem with conventional power distribution systems is that, generally, each electrical load is provided with an individual controller for power distribution purposes. Unfortunately, this leads to an excess of controller capacity because each individual controller must be rated for the maximum load that the requisite electrical appliance can draw. In addition, in most cases, the controllers are actually designed to provide some margin of safety even though (1) the electrical load itself (e.g., an electric motor) may have some inherent safety margin and (2) many electrical loads are generally used at less than full power and/or are only used intermittently.

To this end, embodiments of the present disclosure relate to a networked system of modular power controllers that can be used individually or in parallel to meet existing power demands. Because every electrical load in an aircraft will rarely, if ever, be on at the same time, the system can be designed with a capacity more closely related to nominal or average power consumption (plus some safety margin) rather than "worst case scenario." As a result, the number of components required, component weight, size, and cost can be reduced, system efficiency can be improved, and improved system redundancy can be provided. In the event of a motor controller failure, for example, the system can be reconfigured to assign the load to a functioning motor controller, improving reliability. In addition, if the loads are such that the system is operating at full capacity, all loads can still be powered, albeit at a reduced capacity in some cases.

As shown in FIG. 1, a building block of the system can comprise a plurality of parallel modular converter modules ("modules") 100 that can be networked together to form a parallel modular converter ("converter"), discussed below. In some embodiments, as shown in FIG. 1, each module 100 can comprise onboard processing. In this configuration, the module 100 can comprise at least three processors: the Motor Control Digital Signal Processor ("DSP") 105, the protection processor 110, and the logic processor 115.

In some embodiments, therefore, the DSP 105 can generate, for example, a high-frequency gate drive pulse width modulation signal (PWM) 120 to activate the gate driver 125. The gate driver 125 acts essentially as the switching side of the power module 100, much like an electrical relay. In other words, the output 180 of the module 100 is regulated by the PWM signal 120. To determine the proper PWM signal 120, the DSP 105 can utilize signals from various sensors via a signal processor 135 and/or signals via a module communications bus 140, discussed below.

In some embodiments, the DSP 105 can utilize sensors including, for example and not limitation, temperature sensors 150 and shoot-through sensors 155 to detect potentially damaging conditions. In other embodiments, the DSP 105 can utilize sensors including current sensors (to detect overcurrent conditions), voltage sensors (to detect overvoltage conditions), motor speed and position sensors (to detect over-speed conditions). In addition, many of these sensors (e.g., current, voltage, rotor speed and position sensors can also be used to perform motor control). In some embodiments, the signal processor 135 can condition signals from the sensors and can include an Analog to Digital Converter (ADC) 135a. In other embodiments, the ADC 135 can be a discrete unit that connects via a communications interface to the processors 105, 110, 115. In still other embodiments, the ADC 135 can be integrated into one or more of the processors 105, 110, 115.

Sensor data can comprise, for example and not limitation, module input and output current and voltage, motor position, DC link DM (differential mode) and CM (common mode), voltage and current, motor speed, and power module temperature. In some embodiments, the DSP 105 pulse width modulation method and output power level can be configured by the logic processor 115. To enable communication between module processors 105, 110, 115 and controllers external to the module 100, a module communications bus 140 can be utilized. In some embodiments, to enhance module 100 debugging and verification, for example, load sensor signals and DSP configurations can comprise datasets to be transmitted to a master data logger 310, as discussed below.

It is preferable, and sometimes required, to synchronize the reference clocks between the modules 100 and the motor control DSP 105 to generate synchronous output waveforms 180. Failure to synchronize reference clocks can result in the motor control DSP 105 generating waveforms that are out-of-phase from the waveforms of other modules 100. This, in turn, can potentially create short circuits, which can damage or destroy the modules 100. Variances in the high-frequency system clock of the DSP 105 are relatively insignificant; however, as a few nanoseconds will have little, or no, effect on the output waveforms. The reference clocks are preferably at least synchronized between parallel modules 100 (i.e., modules 100 that are currently feeding power to the same load). In some embodiments, for very accurate synchronization, methods known in the art such as, for example, synchronization via fiber optic cables can be used. Fiber optic can be advantageous because it is immune to the EMI noise generated by the power module switching. As discussed below, in some embodiments, all motor control PWM signals 120 can be executed on a central processor, which distributes PWM gate signals 120 directly to the gate drive circuitry 125 of the IGBT switch modules. This can reduce synchronization issues because paralleled modules receive identical gate signals 120.

In some embodiments, the protection processor 110 can enable safe operation of the module 100. The protection processor 110 can monitor various sensors for unsafe operating conditions including, but not limited to, output AC current and voltage sensors 145, gate driver and inverter temperatures 150, and shoot-through current 155. In some embodiments, the protection processor 110 can also monitor, for example, motor over-speed, over-voltage (DC link), overcurrent at input or output, over-voltage at input and output, CM (common mode) current, excessive voltage ripple, unbalanced input/output current, open phase, and computer failure protection (e.g., if the DSP fails, the protection processor 110 can disable the gate driver 125 independently). In still other embodiments, the protection processor 110 can also compare actual PWM configuration to the commanded PWM configuration. If these signals do not match, the gate driver 125 can also be disabled. In some embodiments, the protection processor 110 can be directly connected to the gate driver 125 enabling nearly instantaneous shutdowns of the inverter 160 should a fault be detected.

Module 100 input fault protection can also be provided by the protection processor 110 in communication with a master protection controller 305 over the module communications bus 140. Should the protection processor 110 detect a fault, for example, the protection processor 110 can instruct the master protection controller 305 to externally disable the module 100. In some embodiments, module 100 faults can also be recorded by the protection processor 110. In some embodiments, the fault can be stored in the memory 110a (e.g., non-volatile memory) of the protection processor 110 and the module 100 can be disabled until it can be repaired or replaced. To aid in debugging, in some embodiments, the protection processor 110 can also log some or all events with the master data logger 310. In this manner, information regarding module faults, communications, master logic commands and other pertinent information can comprise datasets for logging by the master data logger 310.

In some embodiments, the logic processor 115 can regulate the DSP 105 by configuring the modulation method and output power. Coordination between logic processors 115 in parallel modules 100 can enable equal load sharing and clock synchronization. As a result, each logic processor 115 can communicate with the master logic controller 320 for instructions on which load it is assigned to power at present.

As shown, the module 100 can accept a high-voltage DC power (HVDC) that has been rectified by an external rectifier unit. In some embodiments, the input current and voltage can be monitored by current and voltage sensors 165. The DC waveforms can be filtered by a DC electromagnetic inference (EMI) filter 170, which can reduce noise on the DC bus and stabilize input current and voltage. The inverter module 160 can then generate AC waveforms, which can be filtered by an output AC EMI filter 175, for use by the system loads. In some embodiments, additional filters and processors can be used to remove switching transients and smooth the output waveform. In some embodiments, each module 100 can comprise one small input EMI filter 170, for example, and a larger output EMI filter 175 for each load (connecting EMI filters in series improves filter attenuation).

Current and voltage waveforms can also be monitored by additional sensors after the output AC EMI Filter 175. In some embodiments, one or more voltage and/or current sensors at the module 100 and one or more voltage and/or current sensors on the load side. This can enable fault detection in the power switching network 325, discussed below.

Figure 2:
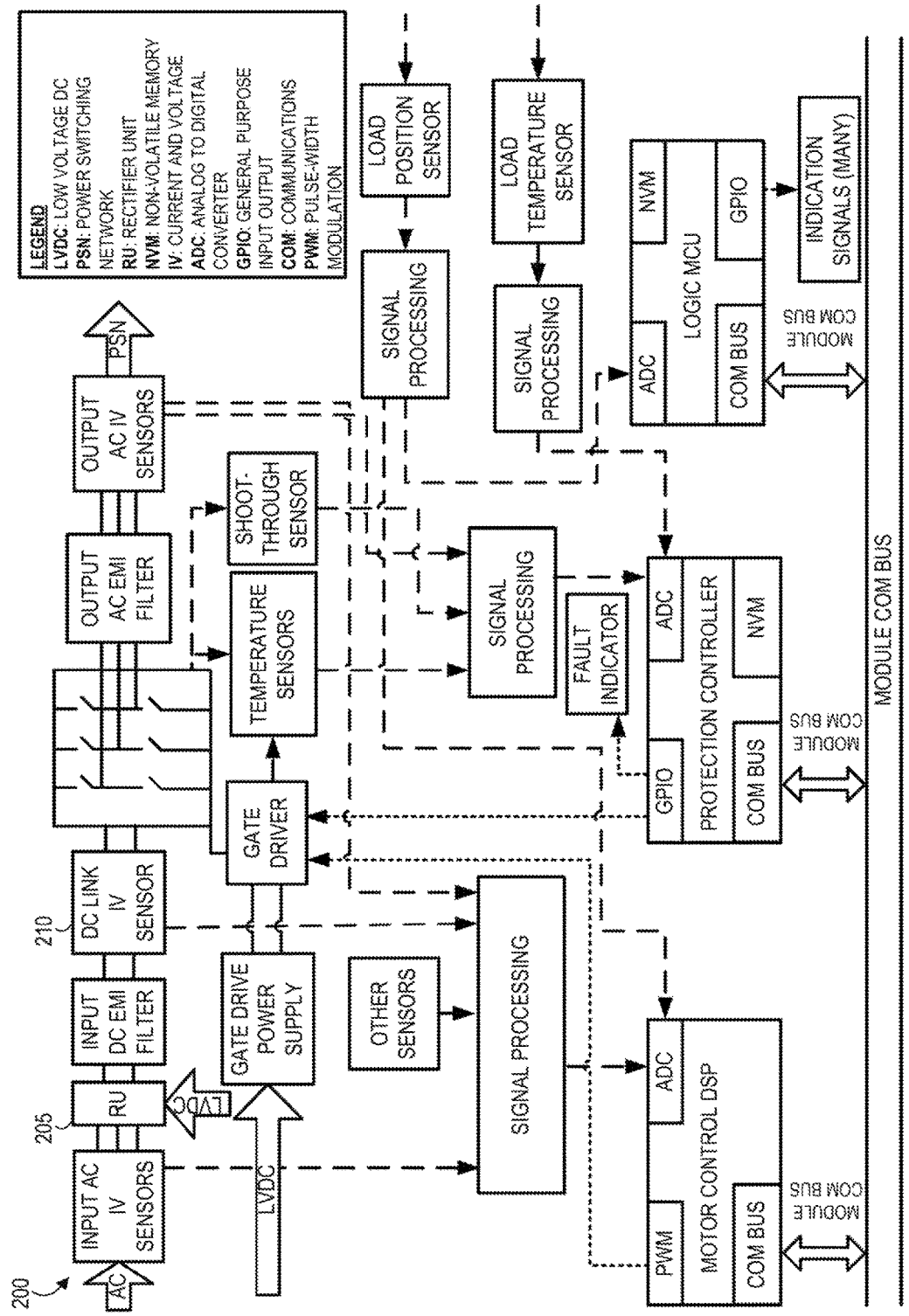
FIG. 2 is an electrical schematic depicting a module for use in a parallel modular converter in an AC input application, in accordance with some embodiments of the present disclosure.

As shown in FIG. 2, in some embodiments, rather than using an external rectifier, a rectifier 205 can be integrated into the module 200. In this configuration, the module 200 can utilize an AC power input, such as a 3-Phase AC power input. The rectifier 205 can comprise, for example and not limitation, an active front end (comprising solid state switches) or traditional passive rectifiers (e.g., multi-pulse autotransformer rectifier units, transformer rectifier units, or diode rectifiers). This configuration can provide increased reliability because, for example, a rectifier 205 failure affects only one module 200. In addition, reliability and safety are improved because there is also a decreased circulating current between modules 200 (i.e., as each module 200 can be isolated from other modules 200). Of course, this approach incurs a slight increase in cost, weight, volume, and complexity of the modules 200 as the result of the additional components 205, 210. In some embodiments, additional current and voltage sensors 210 can be used after the rectifier 205 to sense fault conditions.

Figure 3A:
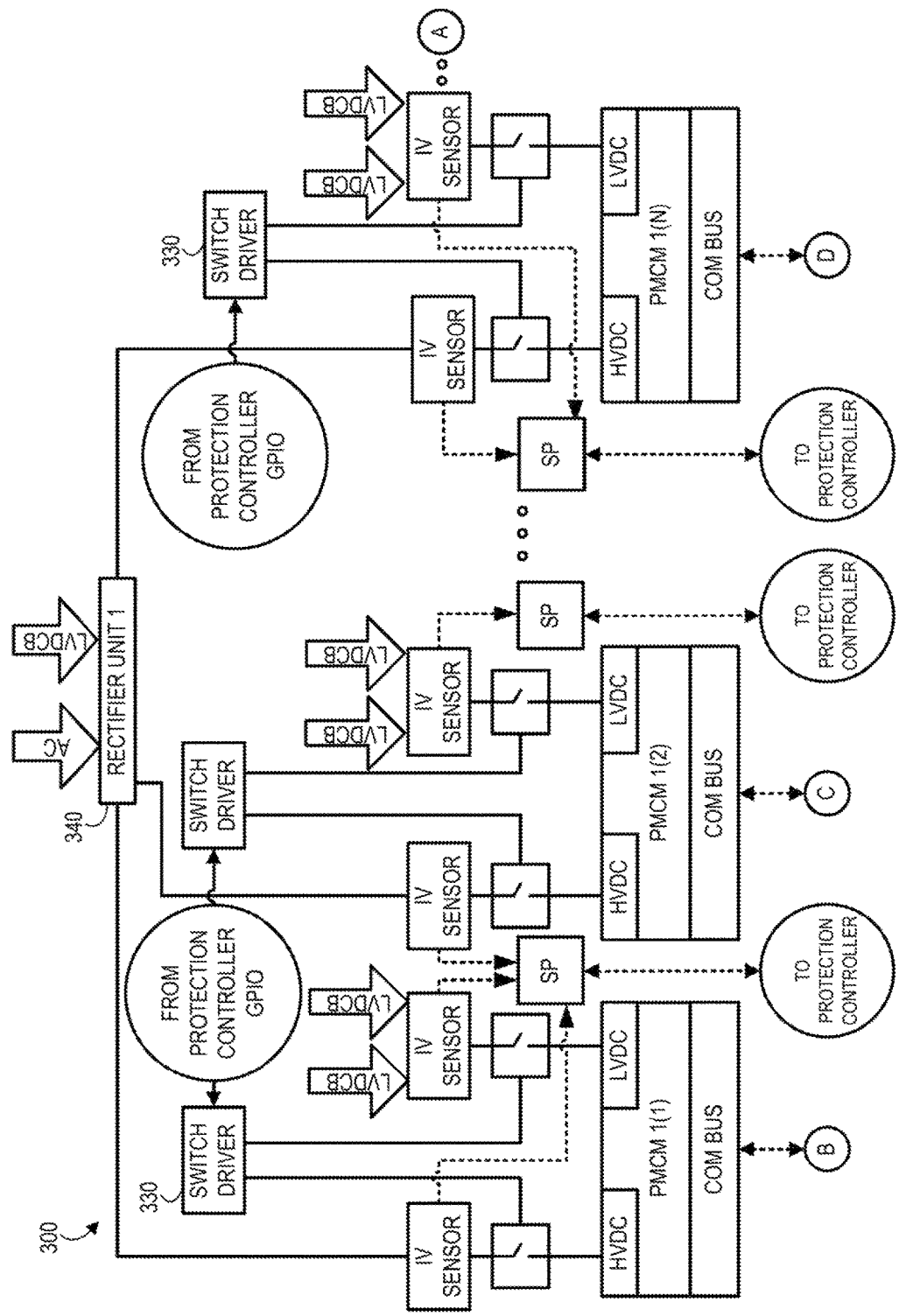
FIGS. 3A-3C are electrical schematics depicting a parallel module converter ("converter") using multiple modules in a high voltage DC current regime, in accordance with some embodiments of the present disclosure.
Figure 3B:
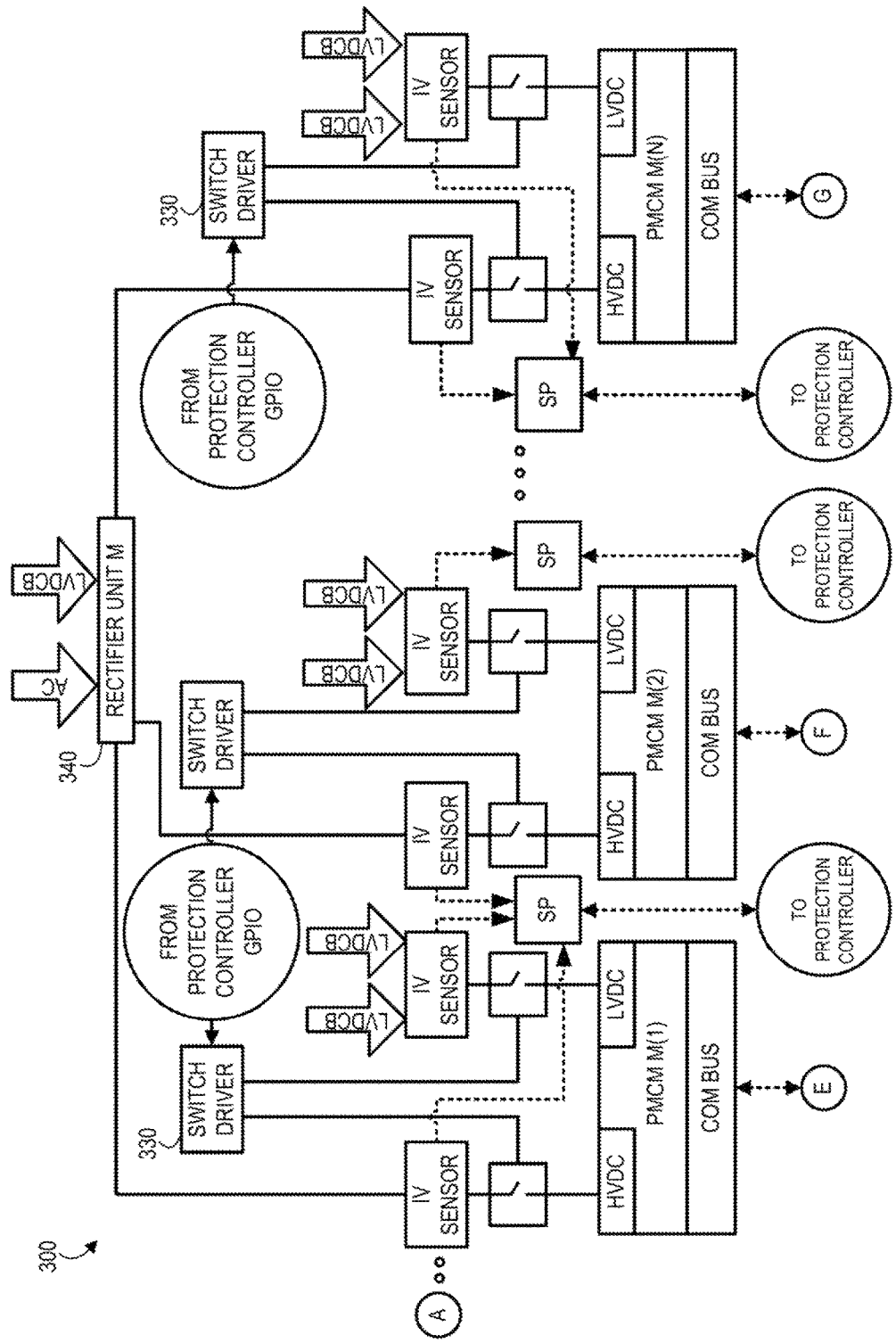
Figure 3C:
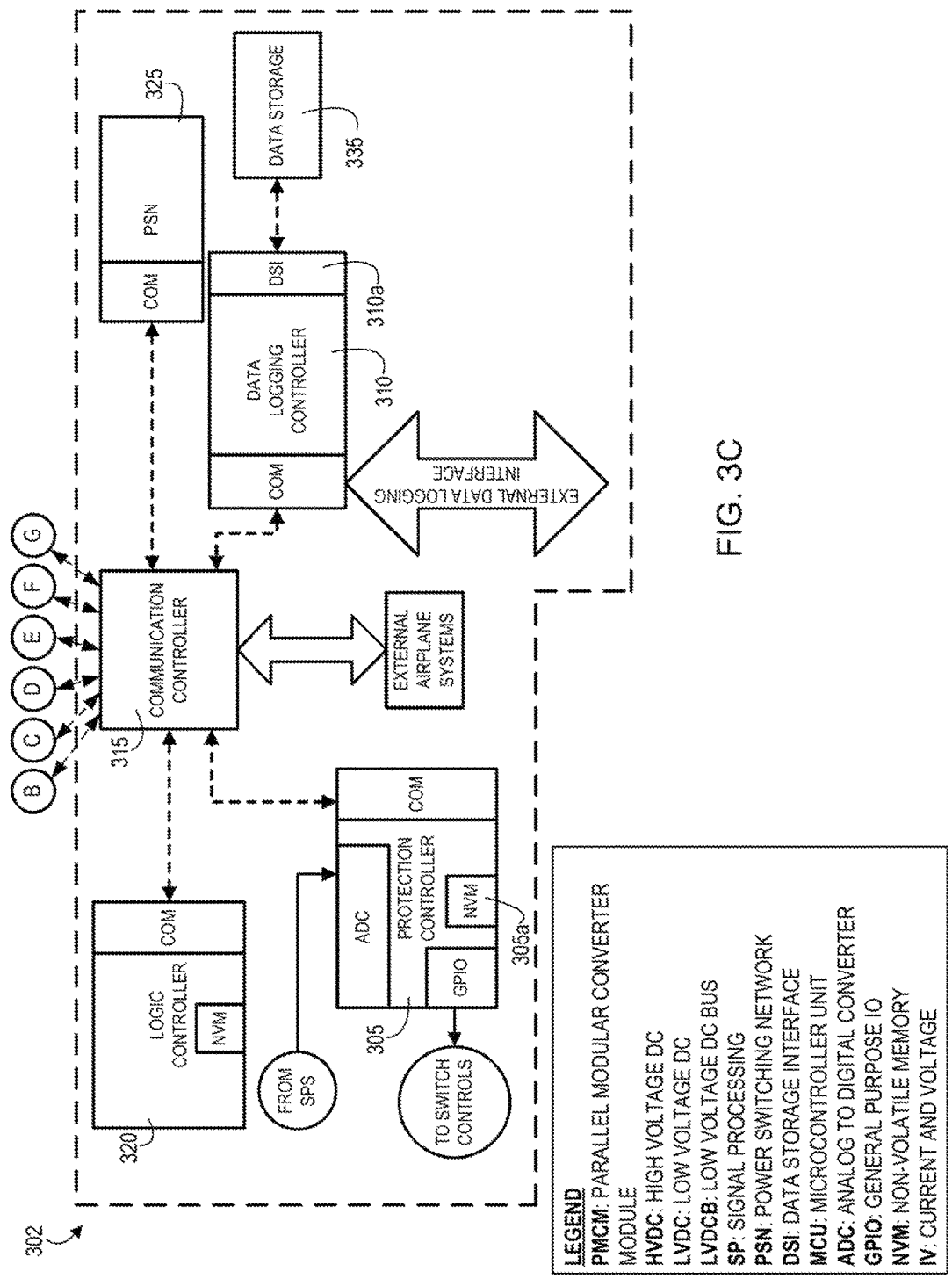

FIGS. 3A-3C depict an overall system 300 architecture for a converter. The master controller 302 can comprise, for example and not limitation, a master communications controller 315, a master logic controller 320, a master protection controller 305, a master data logger 310, and a power switching network 325. The master communications controller 315 can connect each module, via each module's 100 module communications bus 140, enabling message exchanges between modules 100. In addition, messages from the master logic controller 320 can also be routed by the master communications controller 315 to their respective destinations (e.g., to modules 100, external aircraft systems 350, etc.).

In some embodiments, to aid debugging, messages processed by the master communications controller 315 can be duplicated and transmitted to the master data logger 310 where they are recorded for concurrent or future analysis. In some embodiments, the master communications controller 315 can facilitate communications between the modules 100 and external aircraft systems 350 (e.g., aircraft systems 350 external to the system 300 requesting power). In some embodiments, the master logic controller 320 can receive requests for loads at a specified power level (i.e., current and/or voltage) from external airplane systems. The master logic controller 320 can then allocate modules 100 to fulfill power requests by selecting and configuring the modules 100 and power switching network 325 accordingly.

To ensure that any fault conditions occurring in the system 300 are detected and interrupted, the master protection controller 305 can monitor the inputs and outputs to each module 100 including, for example and not limitation, the input current and voltage waveforms of the high-voltage DC Bus and the low-voltage DC Bus. In some embodiments, should a fault occur, the master protection controller 305 can signal the corresponding power switch 330 to disconnect the module 100, record the failure in the master protection controller memory 305a, and send a message of the failure to the master data logger 310. The master protection controller 305 can disable the module 100 until it has been, for example, repaired or replaced.

Logging of control messages and sensor readings, on the other hand, can be handled by the master data logger 310. The master data logger 310 can record the data it receives to a data storage medium 335, which can be in communication via the data storage interface 310a. In some embodiments, such as when high-frequency sensor readings are to be written to the data storage, high-speed high-capacity storage devices can be used. In some embodiments, the reliability of the system 300 can be enhanced using redundant low-voltage DC connections to the master controllers (e.g., the master protection controller 305, master data logger 310, master communications controller 315, and master logic controller 320) and the module's 100 processors (e.g., the motor control DSP 105, protection processor 110, and logic processor 115).

In this configuration, the modules 100 can be powered through rectifier units (rectifiers) 340 external to the modules 100. Each rectifier 340 can power N (any number of) modules 100. Of course, decreasing the number, N, powered by each rectifier 340 can increase reliability, at the expense of increased weight and complexity. As a result, if there are M rectifiers 340, for example, this would result in a total of N*M modules 100. As above, the rectifier 340 can be, for example and not limitation, an AFE, passive diode, or multi-pulse autotransformer unit rectifiers.

Figure 4:
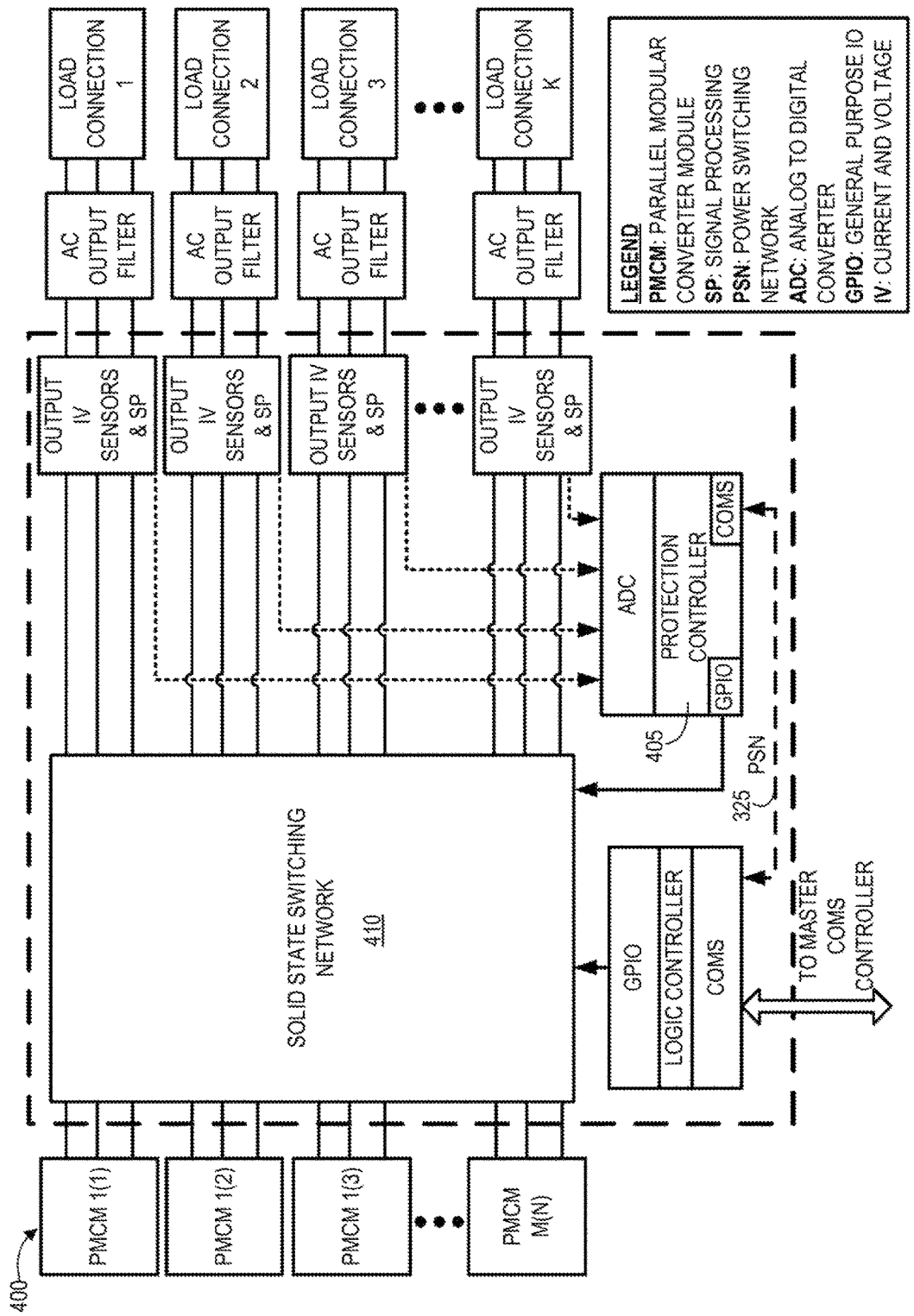
FIG. 4 is an electrical schematic depicting an output configuration, in accordance with some embodiments of the present disclosure.

In some embodiments, as shown in FIG. 4, the output system 400 can include the power switching network 325. The power switching network 325 can switch the module 100 outputs to their assigned load. Load fault identification and interruption can be provided by the monitoring of current and voltage waveforms by the power switching network protection controller 405. Should the power switching network protection controller 405 detect fault conditions, it can open some or all power switching network 325 switches 410 connected to the load. In some embodiments, the power switching network protection controller 405 can also record the fault in NVM to aid with either reclosing the switch 410 (i.e., when the fault has been corrected) or permanently disconnecting a switch 410 (e.g., until it is replaced). The power switching network protection controller 405 can also inform the power switching network 325 of the fault. The power switching network 325 can then open all switches connected to the load, thereby providing redundant system protection. In some embodiments, the output of the system 300 can include a final stage of EMI attenuation, if required. Each load can have one or more dedicated AC Output EMI filters that can filter the combined waveforms from all parallel modules 100. In some embodiments, the switches 410 can be, for example and not limitation, solid state switches or electromechanical contactors.

Figure 5:
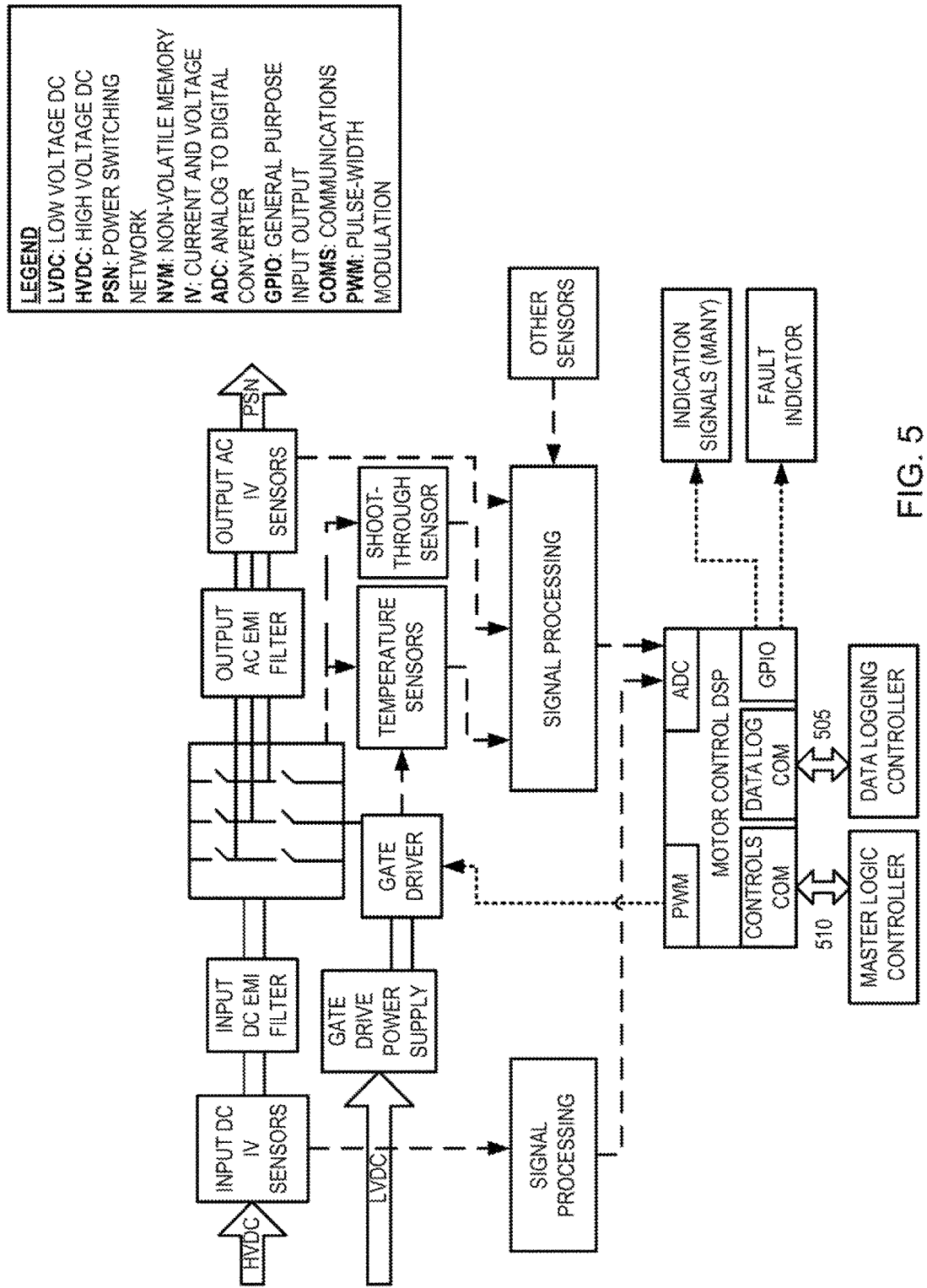
FIG. 5 is an electrical schematic depicting an alternative module with shared controllers in a high voltage DC input application, in accordance with some embodiments of the present disclosure.

In some embodiments, as shown in FIG. 5, rather than multiple module controllers (e.g., the motor control DSP 105, protection processor 110, and logic processor 115), the modules 100 can be primarily controlled by the motor control DSP 105. In this configuration, transferring the logic processor 115 functions to the master logic controller 320 can reduce the number of processors required by the module 100. In some embodiments, this can also eliminate, for example, the power distribution negotiation process between each module's logic processor 115. In this configuration, the motor control DSP 105 can be configured by the master logic controller 320. Load sensor signals can be transmitted by the master logic controller 320 to the motor control DSP 105, as required. In addition, system 300 reference clock synchronization to generate synchronous waveforms can still be provided by the motor control DSP 105.

In this configuration, the protection processor 110 functions can be integrated into the reference clock synchronization to generate synchronous waveforms. In most cases, processing the relatively small number of additional signals does not add significant burden to the motor control DSP 105. Should the motor control DSP 105 identify fault conditions, the motor control DSP 105 can disable the module 100 simply by stopping the PWM signal 120.

In some embodiments, to reduce the bandwidth requirements of the module communications bus 140, the modules 100 can also comprise a separate data-logging communications bus 505. In this manner, the relatively high-bandwidth data-logging communications can be handled by the data-logging communications bus 505, while the controls communications 510, which are relatively low-bandwidth, high reliability communications, can remain on the module communications bus 140. In this manner, the motor control DSP 105 can be connected to both communications buses 505, 510 enabling both types of communications.

Figure 6A:
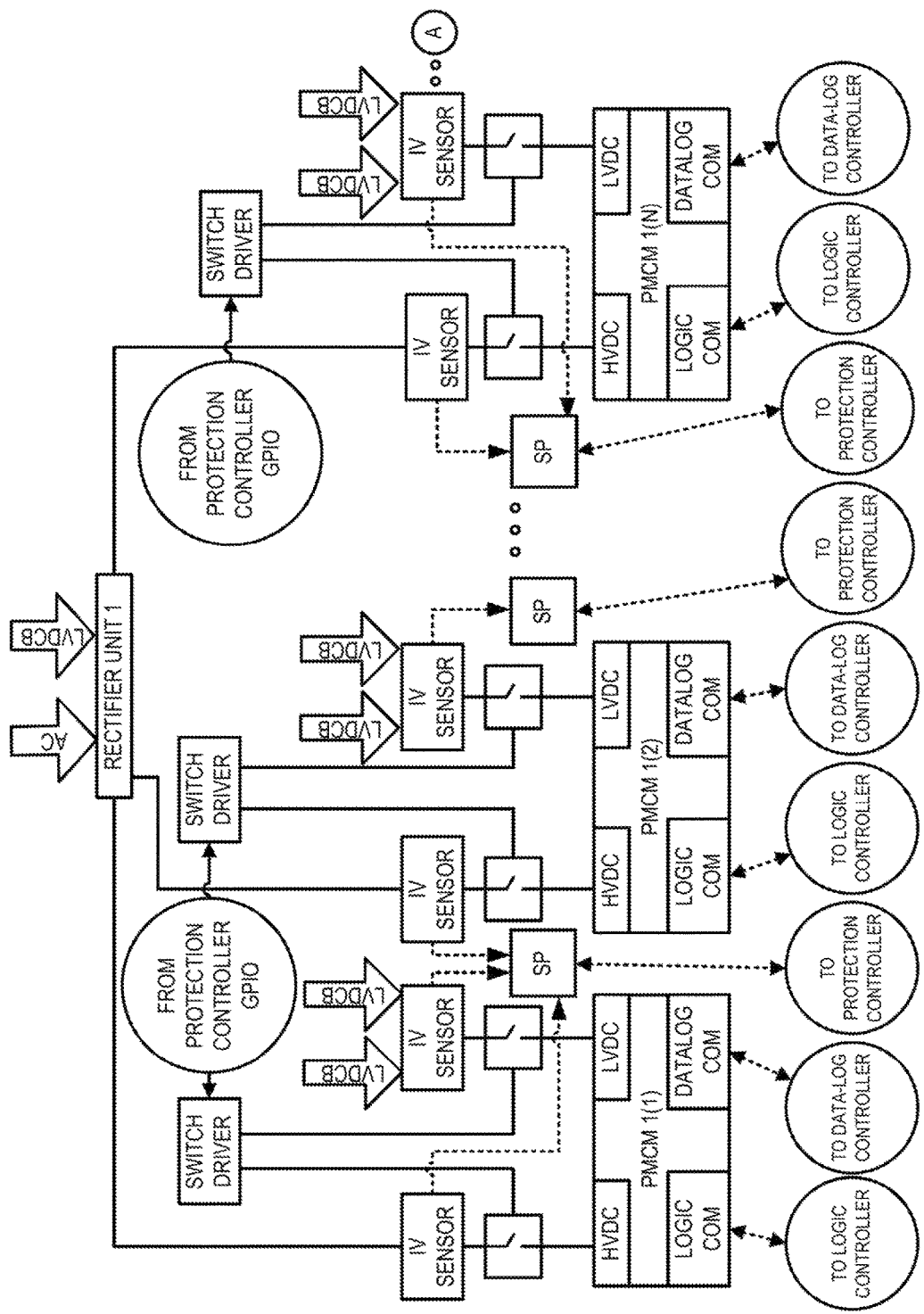
FIGS. 6A-6C are electrical schematics depicting an alternative converter in a high voltage DC input application, in accordance with some embodiments of the present disclosure.
Figure 6B:
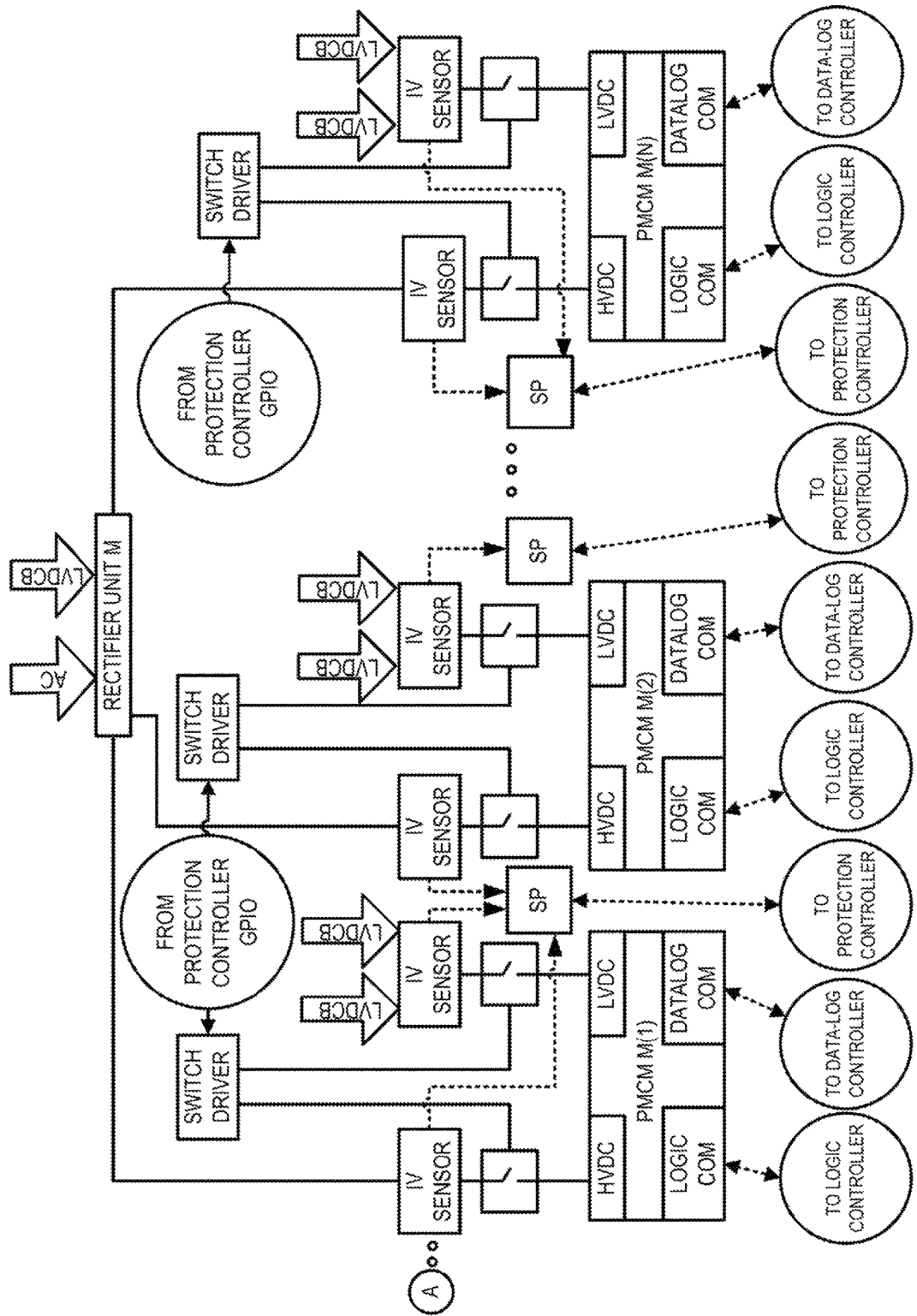
Figure 6C:
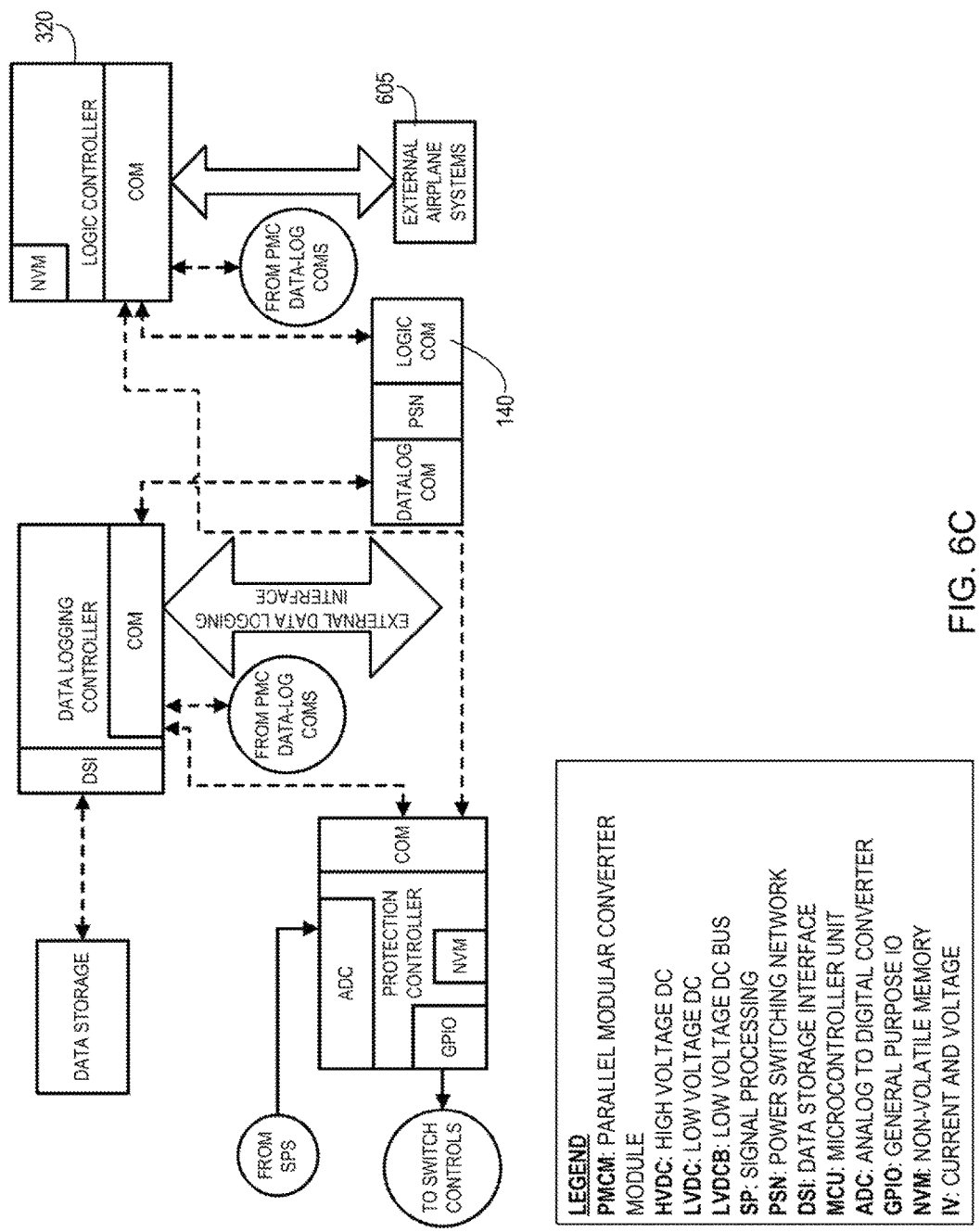

In still other embodiments, as shown in FIGS. 6A-6C, the system 600 can comprise a more prominent master logic controllers 320 and master data loggers 310, enabling the elimination of the master communications controller 315. In this configuration, the master logic controller 320 can connect to every module's logic communications bus to enable configurations to be transmitted to the modules 100. Power distribution between parallel modules 100 and communication with external aircraft systems 605 (i.e., aircraft systems external the system 600, not the aircraft) can be controlled by the master logic controller 320. The master data logger 310 can connect to each module's data-logging communications bus 505 enabling higher frequency data logging. In some embodiments, additional connections can be made to the master protection controller 305 and/or the master logic controller 320 for data storage, while the master protection controller 305 can operate substantially, as discussed above.

Figure 7:
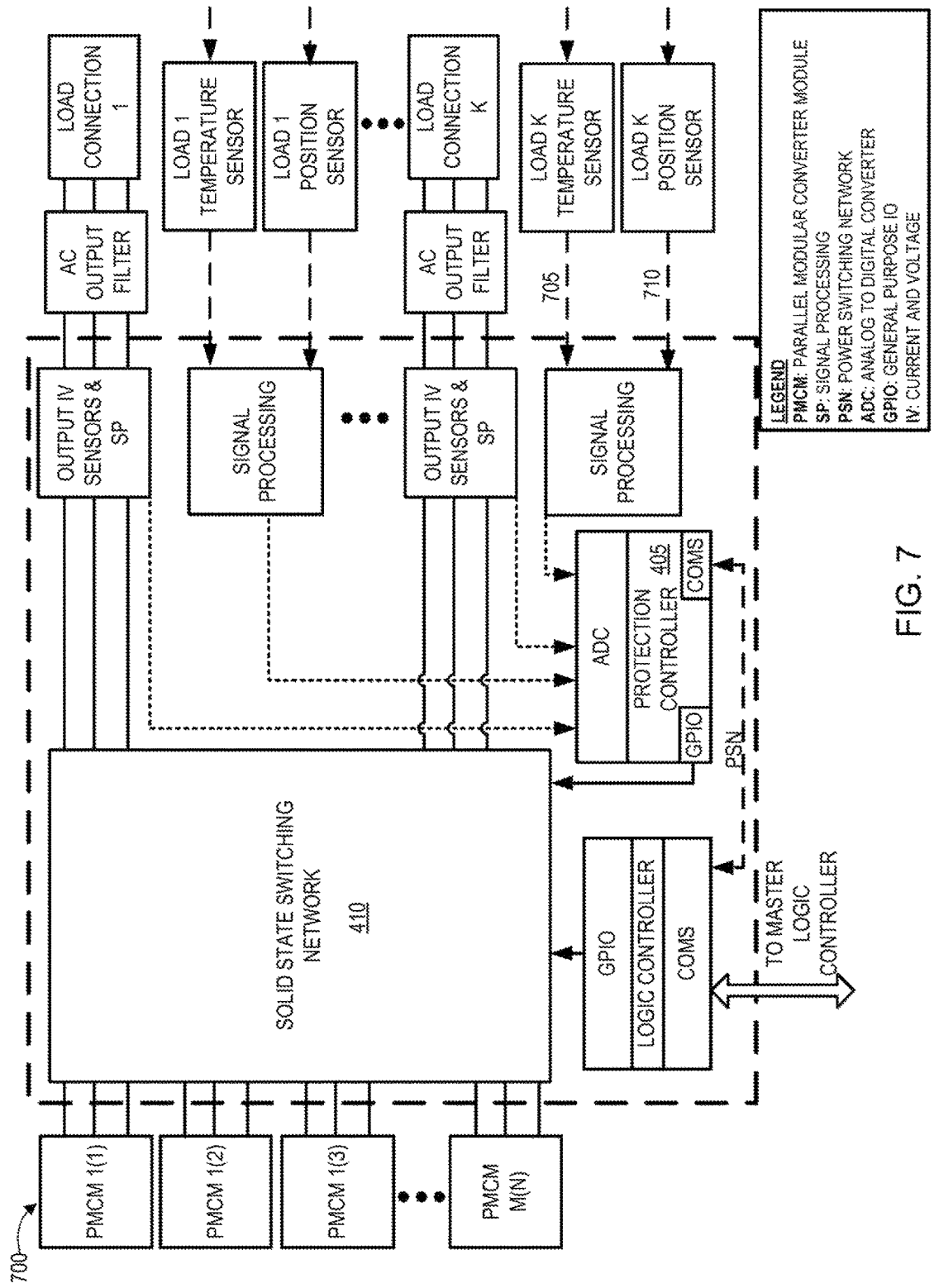
FIG. 7 is an electrical schematic depicting a power switching network, in accordance with some embodiments of the present disclosure.

In some embodiments, as shown in FIG. 7, the system 700 can comprise load sensor signal processing that has been relocated from the individual modules 100 to the system 300 output. In this configuration, the power switching network protection controller 405 can monitor load signals ensuring no faults occur (e.g., over-temperature or over-speed conditions). The power switching network protection controller 405 can relay sensor data including, but not limited to, load temperature 705 and load position 710, to the master logic controller 320 for distribution to the modules 100.

Figure 8:
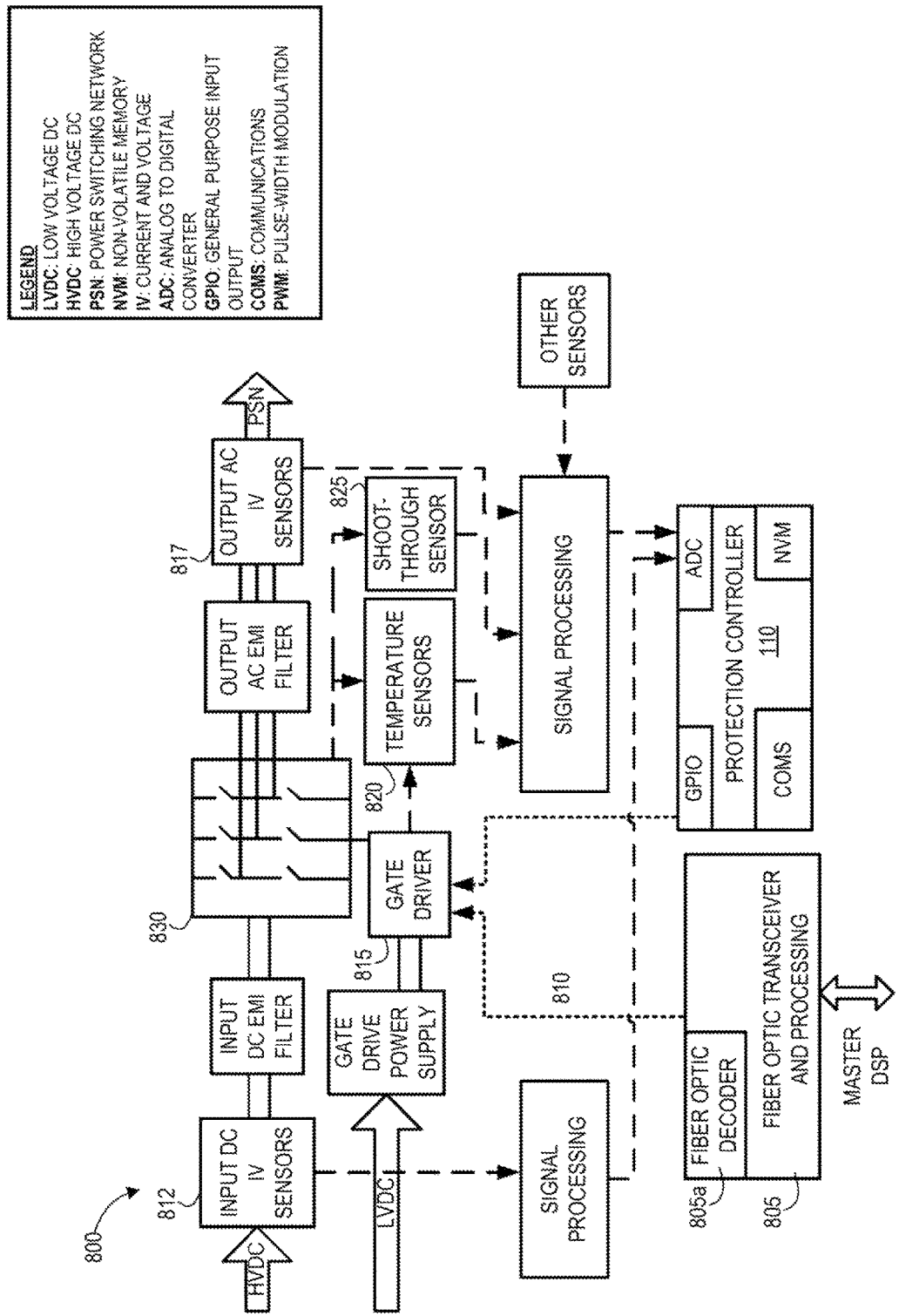
FIG. 8 is an electrical schematic depicting a parallel modular converter, in accordance with some embodiments of the present disclosure.

FIG. 8 depicts an alternative module 800 architecture that eliminates reference synchronization issues (i.e., the synchronization of reference clocks between the modules 100, discussed above). In some embodiments, this can be achieved by relocating the motor controller DSP 105 to the Master Control 302. As mentioned above, the motor controller DSP 105 computes PWM states and then transmits them (e.g., via switch state messages over fiber optics) to the module 800. Fiber optics can be used for intermodule communication, for example, to prevent data corruption on unshielded electrical wires. In this configuration, a fiber optic transceiver 805 can receive the switch state messages.

A decoder 805a within the fiber optic transceiver 805 can then generate a gate drive signal 810 for the gate driver 815. The fiber optic transceiver 805 can transmit, receive, encode, and decode signals from electrical domain to optical and vice versa. Fiber optics signals can be advantageous because optical signals are immune to the EMI noise generated by the power switching network. Optical media can be useful, therefore, to transmit information over relatively long distances (e.g., between modules 100).

The decoder 805*a* can be a logic circuit such as, for example and not limitation, a field programmable gate array (FPGA), complex programmable logic device (CPLD), application specific integrated circuit (ASIC), or processor. The protection processor 110 can provide basic protection by monitoring the current and voltage sensors 812,817 for the DC input and the AC output, respectively, the temperature of module devices 820, and inverter shoot-through 825, among other things. Should a fault occur, the protection processor 110 can disable the inverter 830 and inform the master protection controller 305 of the fault. In some embodiments, the protection processor 110 can communicate with the master protection controller 305 via the fiber optic transceiver 805. In other embodiments, the protection processor 110 can communicate with the master protection controller 305 via the module communications bus 140. In some embodiments, switch state messages and protection messages can be transmitted at different frequencies to enable concurrent communication.

Figure 9A:
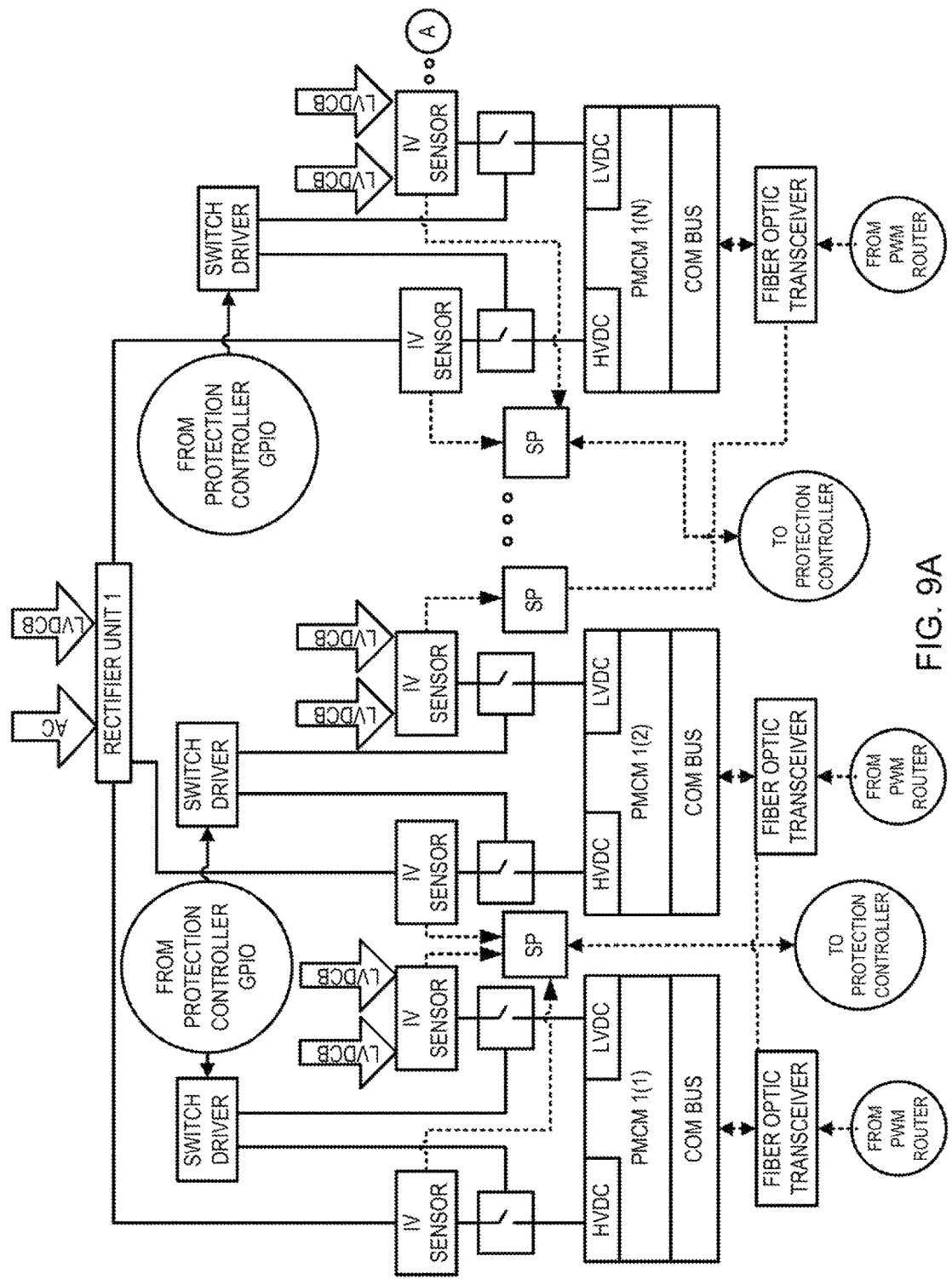
FIGS. 9A-9C are electrical schematics depicting an alternative converter, in accordance with some embodiments of the present disclosure.
Figure 9B:
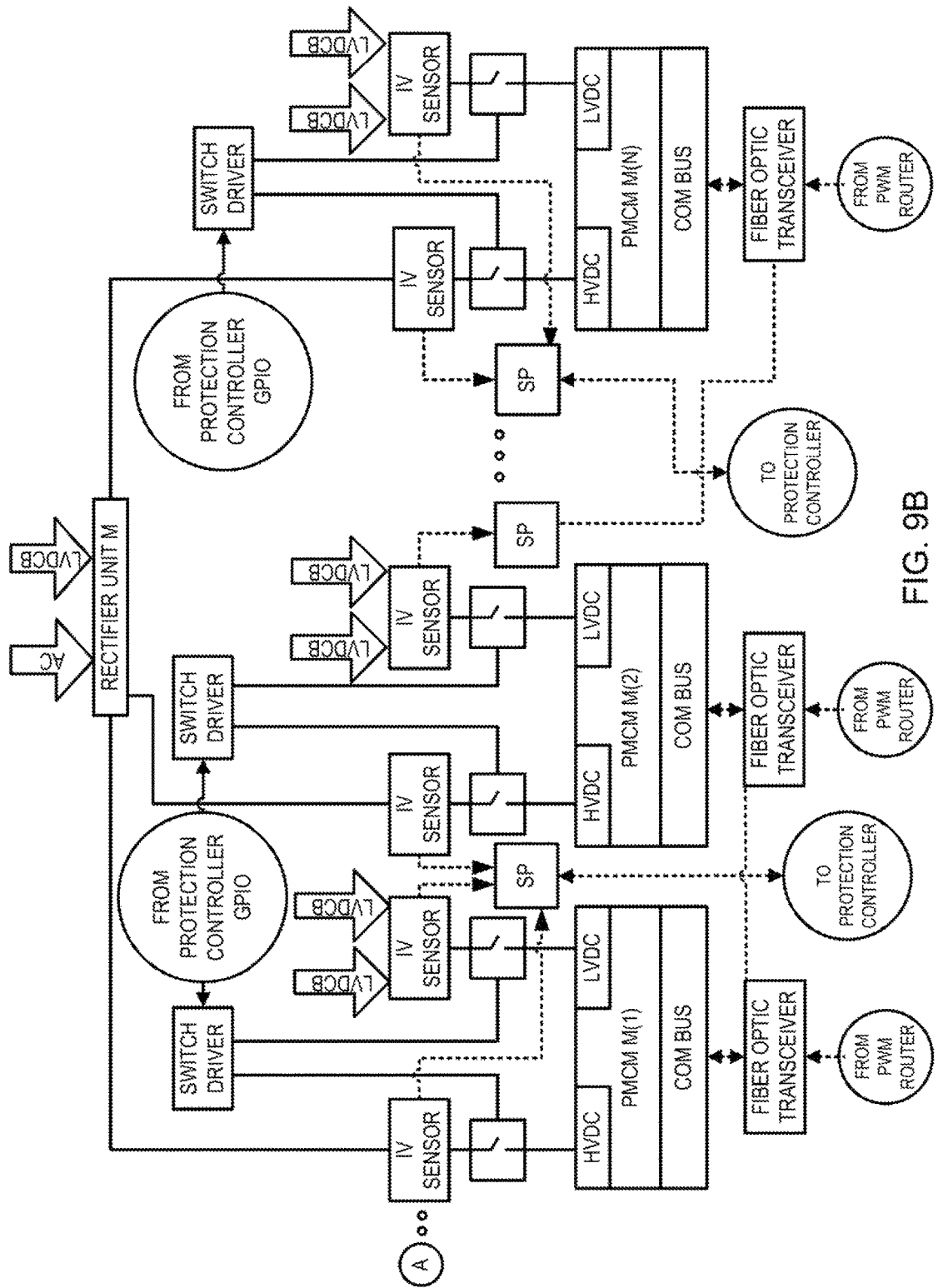
Figure 9C:
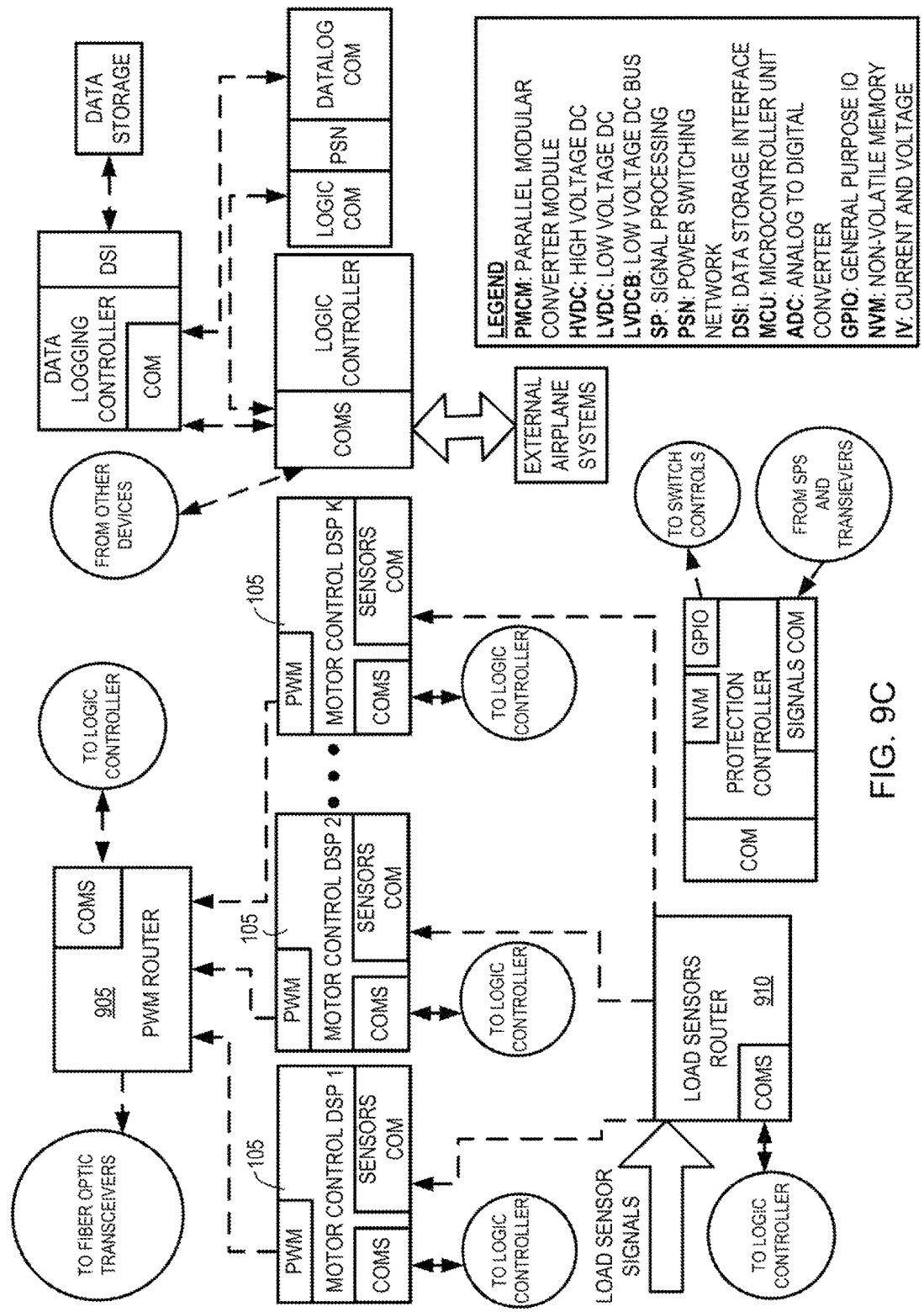

In yet other embodiments, as shown in FIGS. 9A-9C, the motor controller DSPs 105 can be relocated from the module 100 to the master controller 302. By consolidating motor controller DSPs 105, clock synchronization is less difficult due to the close proximity of the devices (i.e., most of the time delay element is removed from the synchronization). In some embodiments, the motor controller DSPs 105 can be placed on a modular accessory board to facilitate repairs of the system 900. The number of motor controller DSPs 105 can be equal to the maximum number of simultaneous loads, K, to be controlled by the system 900. In this configuration, each motor controller DSP 105 can calculate the PWM state then transmit a switch state message to the modules 100, with parallel modules 100 receiving switch state messages from the same motor controller DSPs 105. In some embodiments, a PWM router 905 can be used to route the switch state messages to parallel modules 100. Sensor signals such as, for example, load currents and voltages, can be routed to the respective motor controller DSPs 105 by a load sensors router 910.

In some embodiments, the master logic controller 320 can communicate directly with each motor controller DSPs 105 to configure the necessary control variables (e.g., pulse width and magnitude). In some embodiments, as above, fiber optic transceivers 805 can be used to communicate with the modules 100. Multiple wavelengths/frequencies can also be used to enable the concurrent transmission and/or reception of switch state messages and module fault messages.

The architecture discussed above can provide high reliability because each module's 100 controllers operate nearly independently. In most cases, interaction with other controllers is limited to the allocation of power distribution between the logic processors 115 of various modules 100 and the distribution of load and power by the master logic controller 320. In this configuration, for example, a module 100 failure will not affect the operation of other modules 100. In addition, communication is simplified as the module communications bus 140 provides and interface between the various module processors (e.g. the DSP 105, the protection processor 110, and the logic processor 115) and the master controllers. However this architecture can be somewhat less cost effective and more difficult to implement. Utilization of a dedicated logic controller for minimal tasks, for example, can result in unused processing power increasing module costs. Integration of logic controller functions into other controllers such as the master logic controller 320, on the other hand, would decrease costs and module complexity. Implementation of synchronized reference clocks can add complexity and cost to the module.

Figure 10:
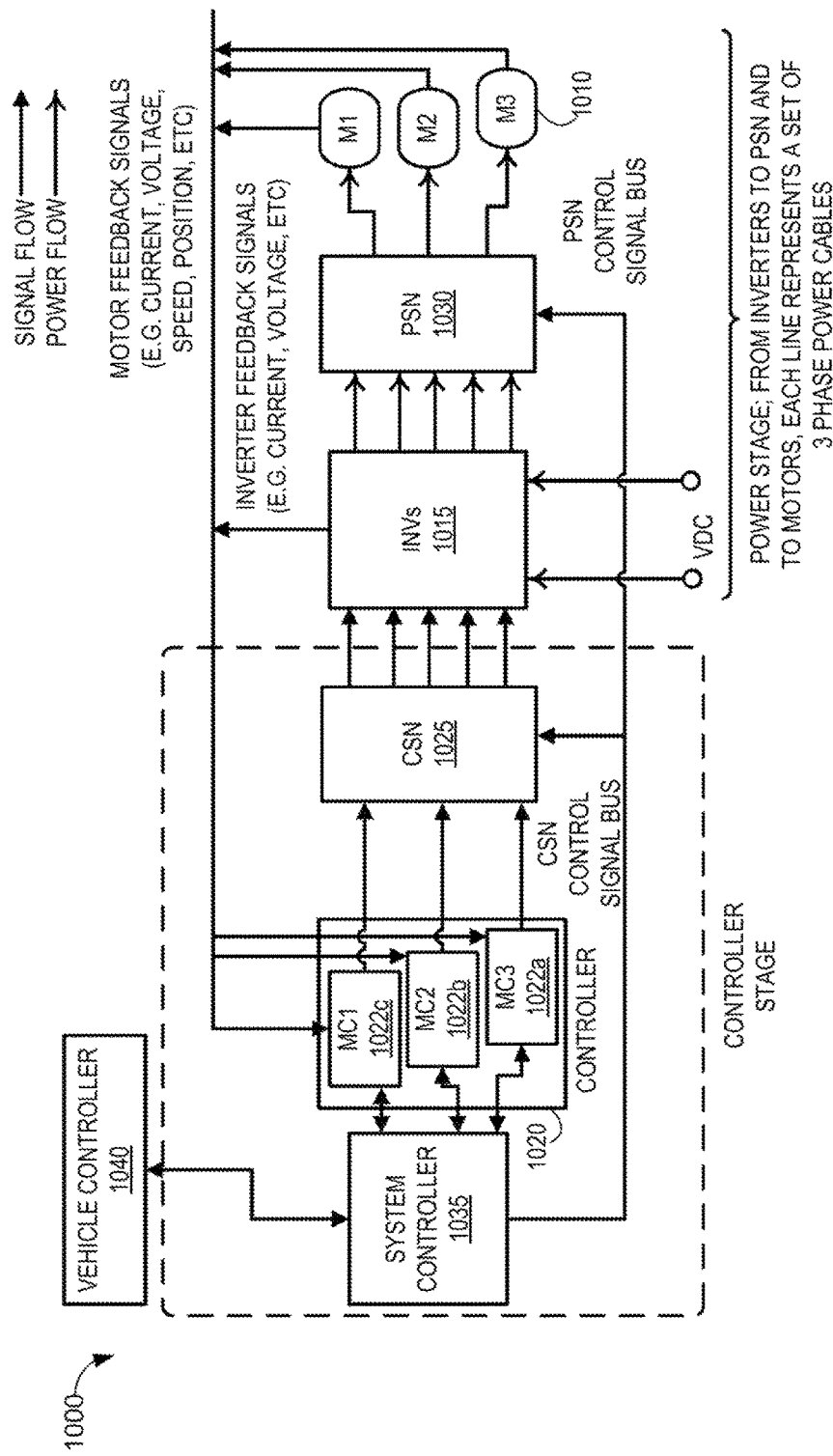
FIG. 10 is an electrical schematic depicting an overall system architecture for the converter, in accordance with some embodiments of the present disclosure.
Figure 11:
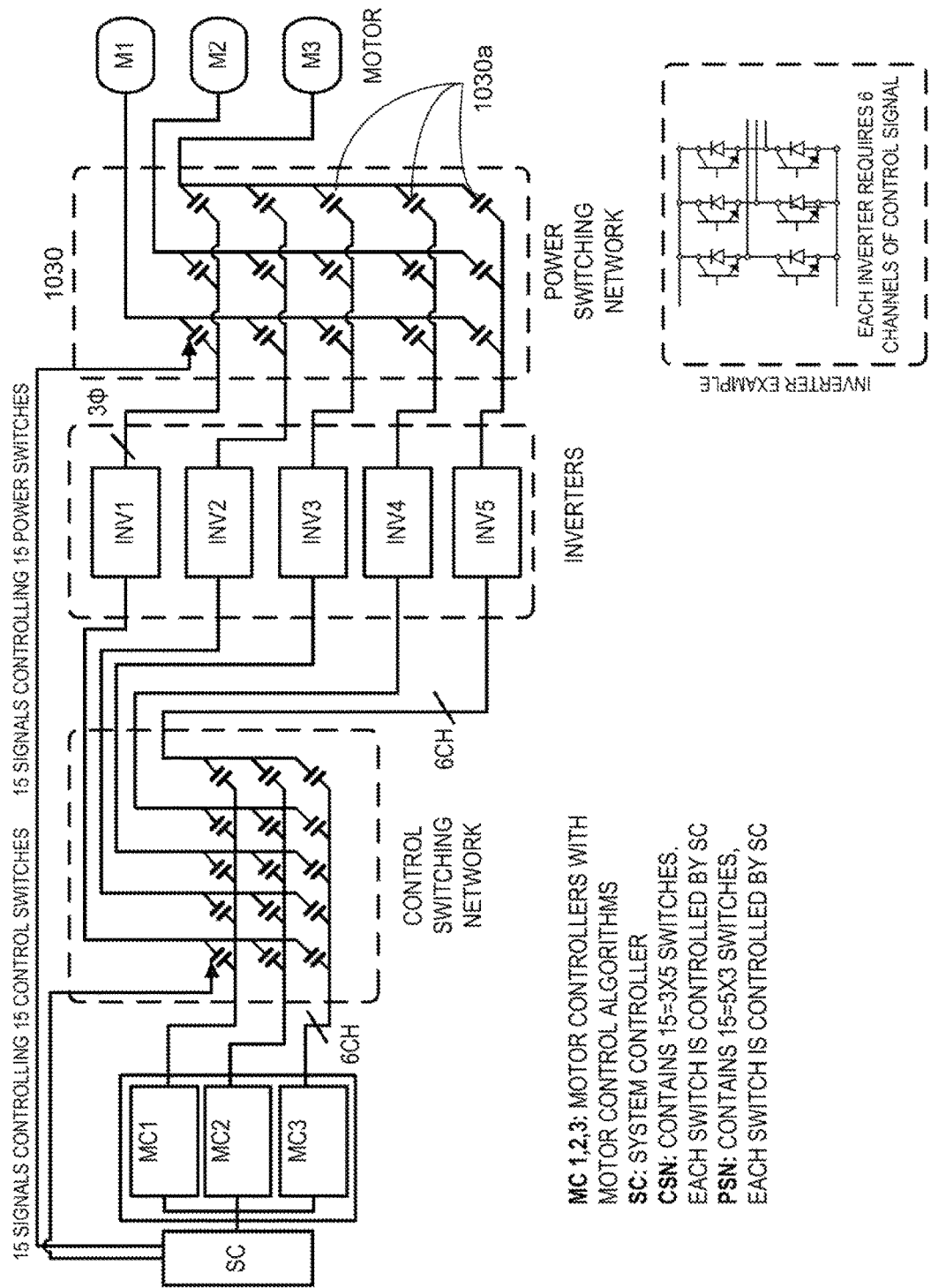
FIG. 11 is a detailed electrical schematic depicting a control switching network and a power switching network of FIG. 10, in accordance with some embodiments of the present disclosure.

The overall system architecture, including the subsystems discussed in FIGS. 1-9C, is shown in FIGS. 10 and 11, the system 1000 can control a system of parallel modular inverters 1015 to drive multiple and/or different types of AC or DC machines 1010. The system 1000 can comprise a plurality of parallel modular inverters 1015 connected in parallel, each of which is able to be configured to receive any of a plurality control algorithms 1022*a*, 1022*b*, 1022*c* embedded in a motor control system 1020 via a reconfigurable control switching network 1025. Each of the parallel modular inverters 1015 can be configured to drive one or more of the plurality of AC machines 1010 on the load side via a reconfigurable power switching network 1030.

This configuration enables, for example, the ability to dynamically reconfigure both the control switching network 1025 and power switching network 1030. In addition, any of the inverters from the plurality inverters 1015 in parallel is accessible to drive any motor of the plurality motors 1010 (or other electrical loads) on the load side and any control algorithm of a plurality of control algorithms 1022 embedded in the system 1000 is accessible to control any of the plurality inverters 1015. As a result, one or more inverters 1015 can drive one motor 1010, as necessary to meet load requirements, and/or a plurality of motors 1010 on the load side can be driven at the same time, each of which can be driven with one or more inverters 1015. In addition, a plurality of motors 1010 on the load side can be driven at the same time with the same control algorithm (e.g., 1020*a*) or a different control algorithm (e.g., 1020*b*).

As shown in FIG. 10, the system can comprise a system controller 1035 configured to communicate with a vehicle controller 1040 to, for example, obtain operation commands from the vehicle controller 1040 and provide system 1000 status signals to the vehicle controller 1040, among other things. In some embodiments, the system controller 1035 can also reconfigure the power switching network 1030 to provide an appropriate number of inverter modules 1015 in parallel to drive a motor 1010 in real time. In other words, when the load from a motor 1010 is increased, the system controller 1035 can signal the power switching network 1030 to place more inverter modules 1015 in parallel. Conversely, of course, when motor load is decreased, the system controller 1035 can signal the power switching network 1030 to disengage one or more inverter modules 1015. If necessary, the system controller 1035 can then place them in parallel with other inverter modules 1015 to drive other loads 1010.

In some embodiments, the system controller 1035 can also reconfigure the control switching network 1025 to provide appropriate motor control algorithms 1022 to one or more of inverter modules 1015 driving one or more motor types. The system controller 1035 can provide algorithms related to, for example and not limitation, field oriented control (FOC), direct torque control (DTC), voltage over frequency control (V/F). This can be useful, for example, to efficiently drive specific motor types (e.g., induction motors, synchronous motors, permanent magnet synchronous motors, brushless DC motors, etc.).

In some embodiments, the system controller 1035 can also send, for example and not limitation, motor speed, torque, or power reference values to corresponding motors 1010 (or motor controllers). In some embodiments, the system controller 1035 can be stored and run on an embedded controller. The system controller 1035 can comprise, for example and not limitation a microcontroller processor, FPGA, or ASIC. In some embodiments, the system controller 1035 can use a real time simulator/emulator or can be run in real-time.

In some embodiments, the number of motor controller algorithms 1022 can be determined by the number of different motor loads. If the system 1000 has three different types of motors 1010 to drive, for example, then three motor controller algorithms 1022 can be developed, with each motor control algorithm 1022 specific to the motor load. Of course, if all three motors 1010 perform the same function with the same motor, it is possible that all three loads can be powered using the same algorithm 1022.

The control switching network 1025 can dynamically configure one or more inverters 1015 each of which can be driven by a specific control algorithm 1022, or a common control algorithm 1022, which is routed through control switching network 1025 per commands from the system controller 1035. In some embodiments, time delay between signals into and out of control switching network 1025 can be minimized to improve motor drive performance.

The control switching network 1025 can be, for example, in a software or hardware implementation. In some embodiments, a software coded control switching network 1025 can be run on, for example and not limitation, an embedded controller, real-time simulator, or computer. In other embodiments, the control switching network 1025 can be implemented using a hardware device such as, for example and not limitation, CPLDs, ASICs, or FPGAs.

In some embodiments, the power switching network 1030 can dynamically configure one or more inverters to drive one or more motors per one or more specific control algorithms from the system controller 1035. In some embodiments, the power switching network 1030 can act as a short circuit and/or over current protection device. In this case, the power switches 1030a associated with the short-circuit or over-current load open when a fault is detected.

The power switching network 1030 can be implemented using, for example and not limitation, solid state relays, mechanical relays, transistors, and other controllable power switches. Of course, the inverters 1015 convert DC power to the requested AC power (e.g., at different voltage levels, frequencies, waveforms, etc.) to drive various AC machines (e.g., AC motors 1010) per the motor algorithm 1022 and system controller 1035. The inverters can comprise, for example and not limitation, insulated-gate bipolar transistors (IGBTs), metal-oxide-semiconductor field-effect transistors (MOSFETs), and bipolar junction transistors (BJTs).

In still other embodiments, the system 1000 can assign loads based on a load priority factor. In other words, if, for example, the number of loads requested by external aircraft systems 1040 (i.e., external to the system 1000) is larger than can be provided by the module 100, the system 1000 can assign loads by a load priority factor, with higher priority loads being powered before lower priority loads. If the aircraft 1040 makes a request for a large load, such as to lower the landing gear, for example, the system 1000 can temporarily reassign some or all of the modules 1015 to power the landing gear motors. When the landing gear is down and locked, in turn, the system 1000 can reassign modules 1015 to their previous loads (or to now existing loads). So, for example, the cabin fan can be temporarily deactivated in favor of the landing gear and then restarted when the gear is down.

In some embodiments, such as when there are an excess of low priority loads that collectively exceed the power rating of the system 1000, the system 1000 may power some or all of the loads at a reduced setting. In this manner, all loads are powered, but may operate at a lower speed or capacity. So, for example, the aircraft cabin fans, lighting, and entertainment system may request power at the same time in excess of the system 1000 rating. As a result, the system 1000 can, for example, provide full power to the entertainment system, but slightly reduce cabin fan speeds and lighting intensity to reduce overall power demand.

Figure 12:
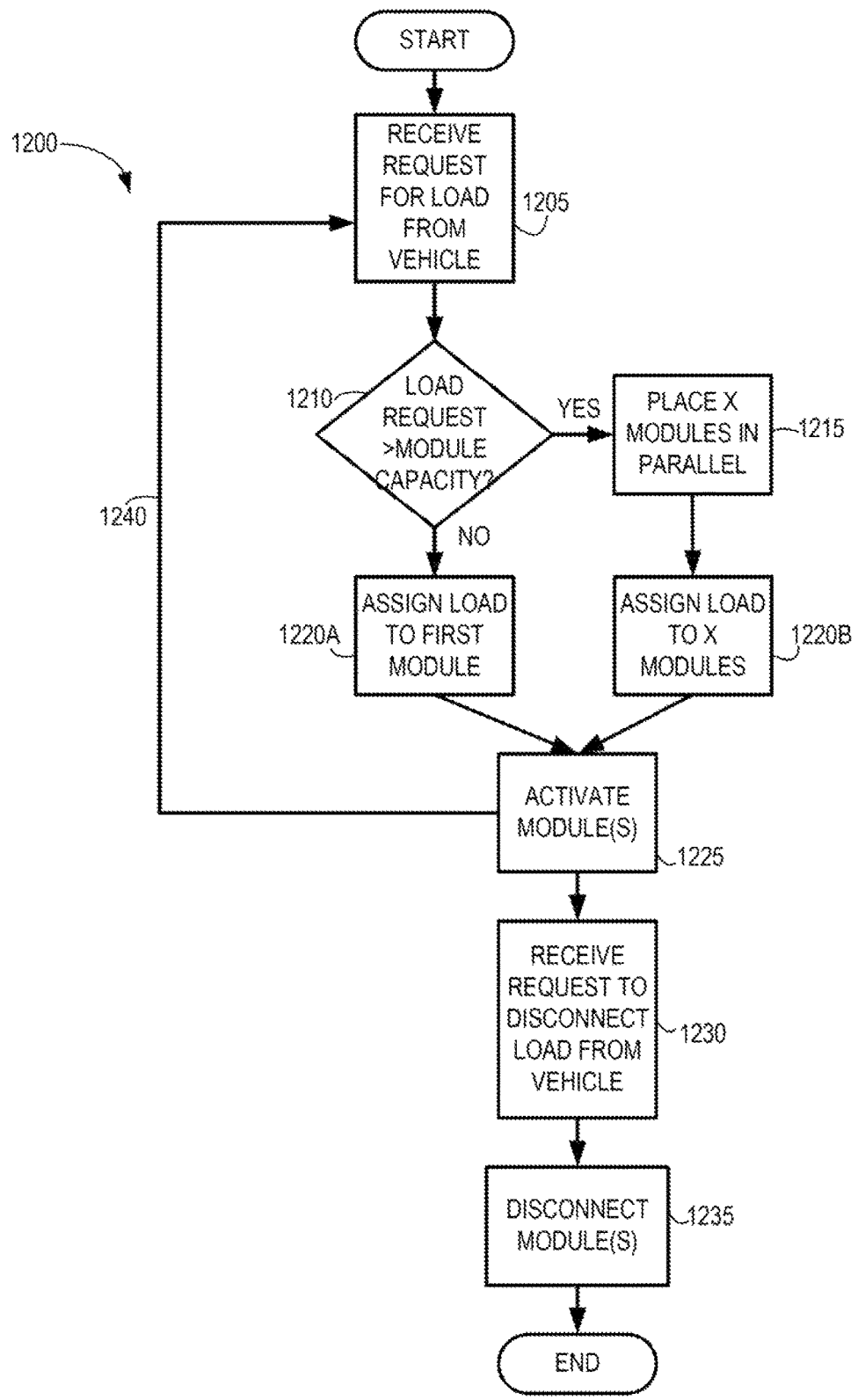
FIG. 12 is a flowchart depicting a method of distributing power, in accordance with some embodiments of the present disclosure.

As shown in FIG. 12, embodiments of the present disclosure can also comprise a method 1200 for distributing power. In some embodiments, the method 1200 can comprise receiving 1205 a load request from the vehicle (e.g., load requests from the vehicle controller 1040). The controller can then determine 1210 if the load requested is above or below the power rating for a single module. If the load request is below the rating for a single module, the controller can assign 1220a the load to a single module. If, on the other hand, the load is greater than a single module can power, the controller can parallel 1215 the number of modules ("X") together that are required to power the load and then assign 1220b the load to the X modules. The controller can then activate 1225 the modules providing the necessary load.

When the vehicle no longer needs the power supply (e.g., the landing gear is down), the vehicle can request 1230 that the load be disconnected and the controller can disconnect 1235 the module, or modules. In some embodiments, the system can also continuously or periodically check 1240 for current system requirements and reassign modules as required.

Example 1

In one example, each module 100 can have a 10 A rating. With ten modules 100 in a converter 300, therefore, the converter can provide 100 A. If the aircraft requests a 25 A load to power the hydraulic motors for the landing gear, for example, the system 300 can determine that the load requires at least three modules 100, place three modules 100 in parallel, and then assign and activate three modules 100 to the load. If, during the operation of the landing gear, for example, the power requirements change—e.g., the power required to start the motors is greater than the continuous power to run the motors—the system 300 can remove (or add) modules 100 as the load changes.

Figure 13:
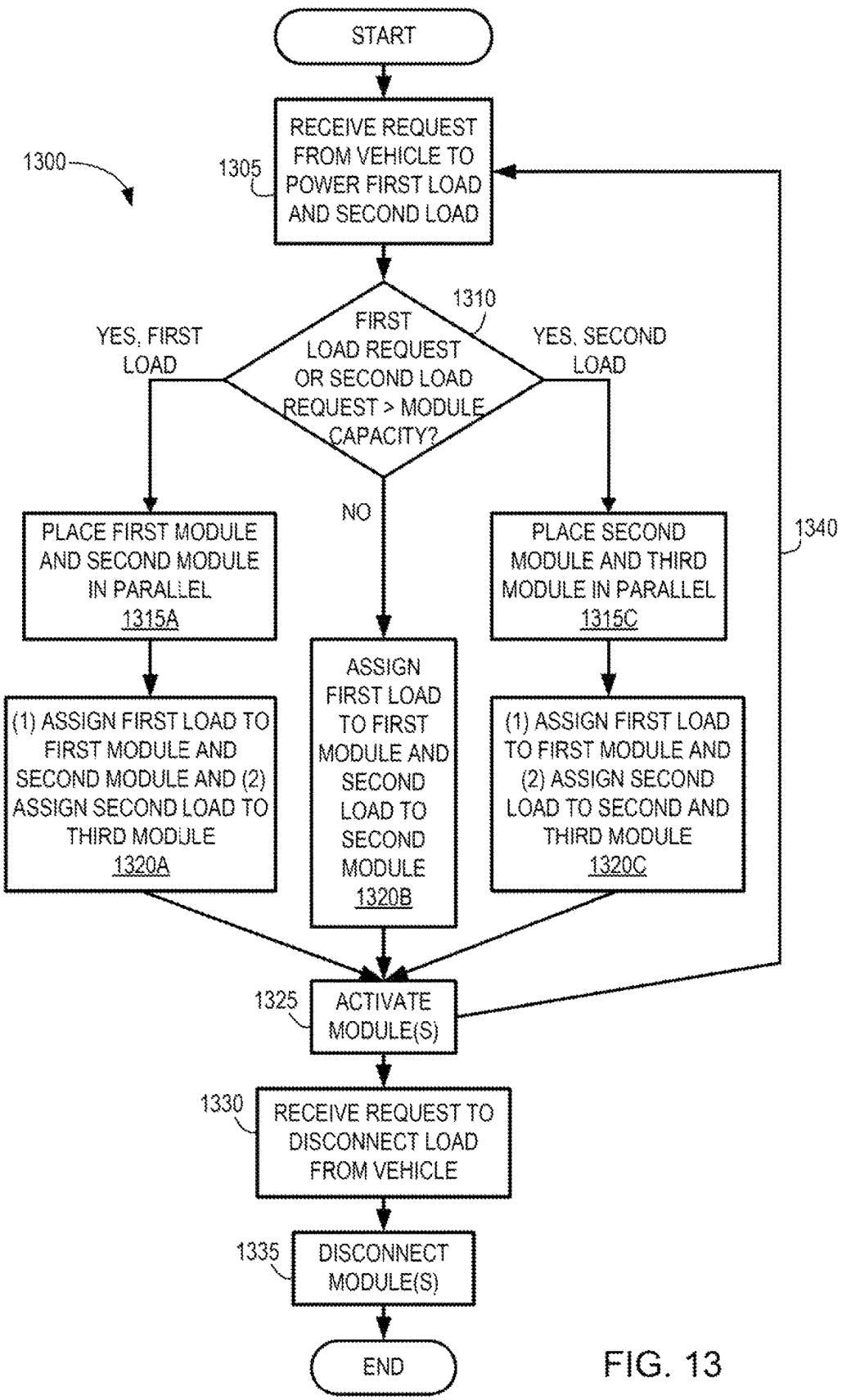
FIG. 13 is a flowchart depicting a method for reapportioning loads to a plurality of modules, in accordance with some embodiments of the present disclosure.

Similarly, as shown in FIG. 13, embodiments of the present disclosure can also comprise a method 1300 for distributing power for multiple loads. In some embodiments, the method 1300 can comprise receiving 1305 at least two load requests from the vehicle. The controller can then determine 1310 if the load requests are above or below the power rating for a single module. If the load requests are below the rating for a single module, the controller can assign 1320b each load to a single module. If, on the other hand, either (or both) load is greater than a single module can power, the controller can parallel 1315a, 1315c two or more modules together and then assign 1320a, 1320c the loads to the parallel modules, as required. The system can then activate 1325 the modules. In some embodiments, the system can also continuously or periodically check 1340 for current system requirements and reassign 1320 modules as required. When the vehicle no longer needs the power supply for one or both loads, the vehicle can request 1330 that the load be disconnected and the controller can disconnect 1335 the module, or modules for that load.

Example 2

In another example, as above, each module 100 can again have a 10 A rating and ten modules 100 in a converter 300 for a total of 100 A capacity. If the aircraft requests a first, 15 A, load to power the hydraulic motors for the landing gear, for example, and a second, 7.5 A, load to turn the cabin fan on low, the system 300 can determine that the load requires at least three modules 100. The system 300 can place a first module 100 and a second module 100 in parallel. The system 300 can then assign the first load to the first module 100 and the second module 100 and the second load to a third module 100.

The system 300 can again continuously or intermittently check to see if the vehicle power requirements have changed 1340. If, during the operation of the landing gear, for example, the power requirements change—e.g., the power required to start the motors is greater than the continuous power to run the motors—and/or the vehicle requests that the cabin fan be placed on high, the system 300 can decouple 1315*c* the first and second modules, pair the second and third modules and assign 1320*c* the first load (the landing gear) to the first module 100 and the second load (the cabin fan) to the second and third modules 100 as the load changes.

Having a plurality of modules 100 in parallel enables the modules 100 to power loads that exceed their individual power ratings. Any number of modules 100 could theoretically be ganged together to power any load. In practice, however, the same input signal does not necessarily produce the same output signal in all modules 100. This can be due to, for example and not limitation, manufacturing tolerances in the modules 100, varying resistances (impedances) in the wiring and connections of the system 300, and variances in the input signals. These variances, in turn, cause variances in the outputs of the modules 100, which results in load imbalances between parallel modules 100.

If the load imbalance is large enough, system components can be damaged or destroyed. Because current divides between parallel modules 100 in inverse proportion to their impedance, a larger current flows through the module 100 with smaller impedance. As a result, a module 100 with lower impedance (and relatedly, a lower load capacity) can be overloaded, while a higher impedance module 100 would be loaded below its capacity. Similarly, the effect of phase imbalances from the AC source (i.e., one phase has a large amplitude than the other) is that each module 100 shares the total load unequally.

Whether from a phase imbalance, poorly matched impedance, or other causes, for a 30 A load, for example, each of three modules might not see a consistent 10 A, but instead see 15 A, 8 A, and 7 A. The load sees the correct 30 A and thus operates normally (i.e., the load does not "care" how the power is distributed.) The IGBTs in the inverters 1015, on the other hand, may carry more than their rated current and this might cause overheating, destruction of the IGBT devices, or erratic tripping of over-current protection, among other things. This can result in failure of the lower impedance module 100, poor system utilization, maintenance issues, and poor system reliability.

Figure 14:
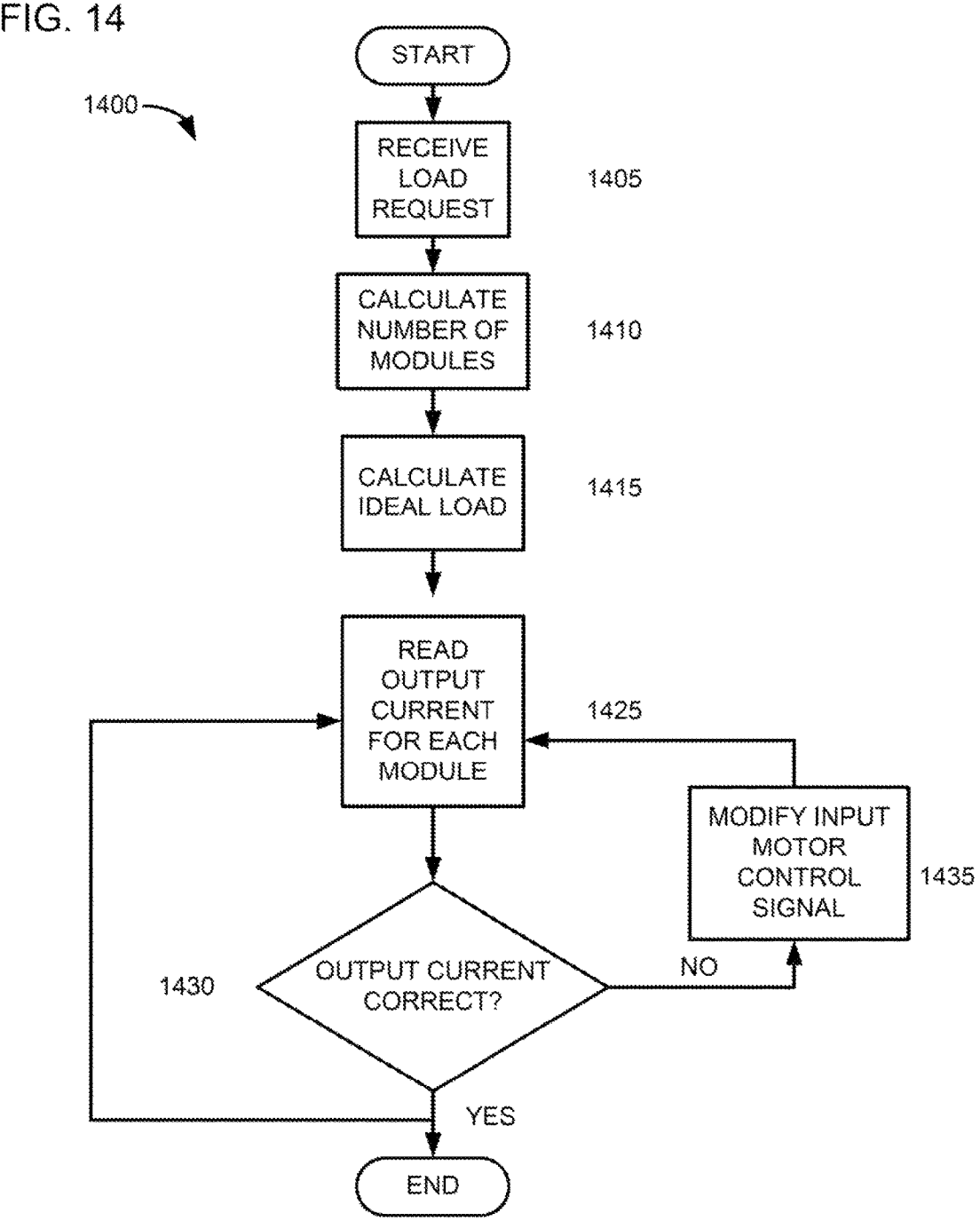
FIG. 14 is a flowchart depicting a method for equalizing current between parallel modules, in accordance with some embodiments of the present disclosure.

To this end, embodiments of the present disclosure can also comprise systems and methods 1400 for balancing loads, controlling phase-to-phase imbalance, and reducing circulating current between parallel modules 100. Embodiments of the present disclosure can comprise a method 1400 for balancing the output current between paralleled modules, as shown in FIG. 14.

In some embodiments, the method 1400 can comprise receiving a load request from an external aircraft system 1405. As before, the method 1400 can then comprise calculating the number of parallel modules required to power the request, as shown at 1410. So, for example, if a 45 A load is requested, and the system uses 10 A modules, the system can determine that a minimum of 5 parallel modules is required. The method 1400 can continue by calculating the theoretical ideal load sharing between the modules, as shown at 1415. In other words, the load that each module would power if the impedance of each module was perfectly matched. In the example above, if each module were perfectly matched, for example, each would provide 9 A to power the load. As mentioned above, the modules can be activated by the system controller 1035 and an appropriate motor control algorithm 1022.

The method 1400 can then measure the output current of each of the activated modules, as shown at 1425, and then determine if the actual output of each module is approximately equal to the ideal load (from 1415), as shown at 1430. In some embodiments, this can be done by direct measurement of the output current or voltage for each module. In other embodiments, the system can monitor other types of feedback in the system, such as, for example and not limitation, inverter temperature, circulating current, or phase imbalance at the load. Modules with higher outputs, for example, will have higher operating temperatures than modules with lower outputs.

As discussed above, because the system uses a single algorithm to calculate the control signals (e.g., PWM gate signals) the outputs of paralleled modules are phase synchronized by design. As a result, any significant imbalance at the load can be an indication of a problem somewhere in the system, such as failing motor windings or insulation causing a short-circuit or an IGBT is beginning to fail. Thus, imbalance at the load can be used as an indication of a fault condition.

In some cases, the terminal voltage of the power switches is small and can be difficult to measure, especially in the presence of large amounts of EMI (generated by the fast switching times) and large currents. As a result, current measurements are generally considered a practical means of determining current sharing imbalances between paralleled modules. If an imbalance exists between the modules, the method can continue by modifying the motor control algorithm to balance the outputs of the modules, as shown at 1435.

If one phase of one module is providing more current than the others it is paralleled with, for example, the pulse width can be slightly reduced to that module and increased on the other modules to balance their outputs. It is also possible to modify the motor control algorithm to compensate for imbalances. In FOC, for example, the method 1400 can take motor measurements and input commands to generate an "average" output command in rotating coordinate system, and a correction can be applied per module. The method 1400 can then generate a different set of PWM signals for each module based on those corrections. In most cases, inputs are all digital including, for example and not limitation, a variable computed in the control algorithm or direct digital logic PWM signals.

This method 1400 can continue while the load is being powered. In some embodiments, the output current can be monitored constantly, for example, or at a predetermined interval (e.g., once per second). In some embodiments, the method 1400 can end when the vehicle controller indicates the load no longer needs to be powered, for example, or when main power to the aircraft is cut (e.g., for overnight storage of the aircraft).

In other embodiments, as shown in FIG. 15, the system 1500 can comprise a load balancer 1505 for balancing the output current for a plurality of modules, or inverters 1015. The load balancer 1505 can receive inputs from the system 1500 including, for example and not limitation, the requested load from the system controller 1035, the input motor control signal 1510 from the motor control system 1020 (via the control switching network 1025) for each inverter 1015, and the output current 1515 for each inverter 1015. So, for example, if each inverter 1015 is receiving the same input 1510, but a first inverter 1015 is providing a lower output current 1515, the load balancer 1505 can modify the input motor control signal 1510 to the first inverter 1015 to obtain a matched output current 1515 to the remaining inverters 1015.

In some embodiments, the load balancer 1505 can comprise many types of feedback controllers. In some embodiments, the load balancer 1505 can comprise, for example and not limitation, a proportional-integral (PI), proportional-integral-derivative (PID) controller, fuzzy logic, or neural net. In other embodiments, the load balancer 1505 can calculate the theoretical "ideal" load for each inverter 1015 (as previously shown at 1415). In some embodiments, the ideal load can assign an equal portion of the load to each inverter 1015. In this manner, the load balancer 1505 can monitor the output current 1515 for each inverter 1015 and adjust the input motor control signal 1510 accordingly. In this configuration, the error for the load balancer 1505 is the difference between the output current 1515 for each inverter 1015 and the ideal output current (i.e., such that each inverter 1015 is providing the same proportion of the total load requested from the vehicle controller 1040). The load balancer 1505 can then minimize the error (e.g., current imbalance) by adjusting the input motor control signal 1510 to each inverter 1015.

While several possible embodiments are disclosed above, embodiments of the present disclosure are not so limited. For instance, while several possible configurations have been disclosed for the parallel module converter components, other suitable configurations and components could be selected without departing from the spirit of the disclosure. The load balancer 1505 is depicted as a separate controller, for example; however, the load balancer 1505 could also be incorporated into an existing controller (e.g., the system controller 1035) to decrease the number of separate components in the system. In addition, the location and configuration used for various features of embodiments of the present disclosure such as, for example, the number of modules, the types of electronics used, etc. can be varied according to a particular aircraft or application that requires a slight variation due to, for example, the size or construction of the aircraft, or weight or power constraints. Such changes are intended to be embraced within the scope of this disclosure.

The specific configurations, choice of materials, and the size and shape of various elements can be varied according to particular design specifications or constraints requiring a device, system, or method constructed according to the principles of this disclosure. Such changes are intended to be embraced within the scope of this disclosure. The presently disclosed embodiments, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A system for powering a plurality of electrical loads, the system comprising:
   a first parallel modular converter module having a first input and a first output configured to provide a first alternating current (AC) output to a first load of the plurality of electrical loads;
   a second parallel modular converter module having a second input and a second output configured to provide a second AC output to the first load;
   a load balancer connected to the first input, the second input, the first output, and the second output, wherein the load balancer is configured to:
      compare the first output from the first parallel modular converter module with the second output from the second parallel modular converter module, and
      modify, upon determining an imbalance exists between the first output and the second output, an associated control algorithm for one or both of the first parallel modular converter module and the second parallel modular converter module to thereby equalize the first output and the second output;
   a controller configured to generate one or more control signals corresponding to one or more selected control algorithms of a plurality of control algorithms, wherein the plurality of control algorithms includes the associated control algorithm; and
   a control switching network comprising a plurality of switching elements and configured to transmit a first control signal of the one or more control signals to apply the associated control algorithm to the first parallel modular converter module and to the second parallel modular converter module when coupled with the first load.

2. The system of claim 1, further comprising:
   a third parallel modular converter module having a third input and a third output configured to provide a third AC output to the first load,
   wherein comparing the first output with the second output comprises comparing respective output currents of the first output, the second output, and the third output,
   wherein modifying the associated control algorithm for one or both of the first parallel modular converter module and the second parallel converter module comprises modifying the associated control algorithm for one or more of the first parallel modular converter module, the second parallel modular converter module, and the third parallel modular converter module, and
   wherein equalizing the first output and the second output comprises substantially balancing the respective output currents of the first output, the second output, and the third output.

3. The system of claim 1, wherein the load balancer comprises a proportional-integral-derivative (PID) controller.

4. The system of claim 3, wherein the PID controller is configured to:
   determine an amount of imbalance based on a difference between respective output currents of the first output and the second output,
   wherein modifying the associated control algorithm for one or both of the first parallel modular converter module and the second parallel converter module is performed by the PID controller to reduce the amount of imbalance.

5. A parallel modular converter comprising:
a first parallel modular converter module configured to provide a first alternating current (AC) output and connected to a module communications bus;
a second parallel modular converter module configured to provide a second AC output and connected to the module communications bus;
a master logic controller configured to assign the first parallel modular converter module and the second parallel modular converter module to power a first load;
a master communications controller connected to the module communications bus and configured to route messages between the master logic controller and the first parallel modular converter module and the second parallel modular converter module, whereby a calculated ideal load sharing value is applied to control the first AC output and to the second AC output;
a load balancer connected to a respective input and a respective output of each of the first parallel modular converter module and the second parallel modular converter module, wherein the load balancer is configured to:
determine, responsive to application of the calculated ideal load sharing value, that an imbalance exists between the first AC output and the second AC output; and
modify, responsive to determining that the imbalance exists, an associated control algorithm for one or both of the first parallel modular converter module and the second parallel converter module to thereby equalize the first AC output and the second AC output;
a motor control system configured to generate one or more control signals according to one or more selected control algorithms of a plurality of control algorithms, wherein the plurality of control algorithms includes the associated control algorithm; and
a control switching network comprising a plurality of switching elements and configured to transmit a first control signal of the one or more control signals to apply the associated control algorithm to the first parallel modular converter module and to the second parallel modular converter module when coupled with the first load.

6. The parallel modular converter of claim 5, wherein assigning the first parallel modular converter module and the second parallel modular converter module to power a first load comprises placing the first parallel modular converter module and the second parallel modular converter module in parallel using a power switching network.

7. The parallel modular converter of claim 6, further comprising:
a third parallel modular converter module configured to provide a third AC output and connected to the module communications bus,
wherein assigning the first parallel modular converter module and the second parallel modular converter module to power a first load comprises placing the first parallel modular converter module, the second parallel modular converter module, and the third parallel modular converter module in parallel using the power switching network, and assigning the first load to the first parallel modular converter module, the second parallel modular converter module, and the third parallel modular converter module, and
wherein modifying a control algorithm for one or both of the first parallel modular converter module and the second parallel modular converter module comprises modifying the associated control algorithm for one or more of the first parallel modular converter module, the second parallel modular converter module, and the third parallel modular converter module to thereby equalize the first AC output, the second AC output, and the third AC output.

8. The parallel modular converter of claim 7, wherein equalizing the first AC output, the second AC output, and the third AC output comprises balancing respective output currents of the first parallel modular converter module, the second parallel modular converter module, and the third parallel modular converter module.

9. The parallel modular converter of claim 8, wherein the associated control algorithm comprises a field-oriented control (FOC) algorithm, and wherein balancing respective output currents comprises modifying a pulse width modulation (PWM) signal for one or more of the first parallel modular converter module, the second parallel modular converter module, and the third parallel modular converter module.

10. A method for balancing outputs between a plurality of parallel modular converter modules, the method comprising:
receiving, at a system controller, a request from a vehicle controller to power a first load;
calculating, using a load balancer coupled with the system controller, a first number of parallel modular converter modules sufficient to power the first load;
placing, using a master logic controller coupled with the load balancer, the first number of modules selected from a plurality of parallel modular converter modules in parallel;
configuring, responsive to a first control signal from the system controller, a control switching network to transmit, from a plurality of received control signals corresponding to a plurality of control algorithms, a second control signal to the selected modules to apply a first control algorithm thereto, the first control algorithm selected from the plurality of control algorithms, the control switching network comprising a plurality of switching elements and arranged between the system controller and the load balancer;
sensing, using the load balancer, a respective output from each of the selected modules; and
modifying, using the load balancer and upon determining an imbalance exists between the respective outputs of the selected modules, the first control algorithm for one or more individual modules of the selected modules to equalize the outputs of the selected modules.

11. The method of claim 10, further comprising:
calculating, using the load balancer, an ideal load sharing value to apply to each of the selected modules,
wherein modifying the first control algorithm for one or more individual modules of the selected modules comprises modifying an input signal to one or more of the selected modules such that the output of each of the selected modules is substantially equal to the calculated ideal load sharing value.

12. The method of claim 11, wherein modifying the input signal operates to synchronize respective output currents for each of the selected modules.

13. The method of claim 12, wherein the first control algorithm comprises a field-oriented control (FOC) algorithm, and wherein modifying the input signal comprises modifying a pulse width modulation (PWM) signal of the FOC algorithm to thereby substantially balance the respective output currents.

14. The method of claim 10, wherein the first control algorithm comprises a voltage over frequency control algorithm.

15. The method of claim 10, wherein modifying the first control algorithm for one or more individual modules of the selected modules comprises modifying an input signal with a proportional-integral-derivative (PID) controller of the load balancer.

16. The method of claim 15, wherein an error for the PID controller comprises a difference between output currents of the selected modules, and wherein modifying the first control algorithm for one or more of the selected modules comprises the PID controller modifying the input signal to one or more of the selected modules to reduce the error.

17. The method of claim 11, wherein the load balancer comprises a proportional-integral-derivative (PID) controller, wherein an error for the PID controller comprises a difference between output currents of the selected modules and the ideal load sharing value, and wherein the PID controller modifies the input signal to one or more of the selected modules to thereby reduce the error.

18. The method of claim 10, further comprising:

calculating, upon determining that a power requirement of the first load has changed, a second number of parallel modular converter modules that is sufficient to power the first load, wherein the second number of modules is less than the first number of modules;

removing, according to the second number of modules, at least one module from the first number of modules placed in parallel; and reconfiguring the control switching network such that the second control signal is no longer transmitted to the removed at least one module.

19. The method of claim 18, further comprising:

reconfiguring the control switching network to transmit a third control signal of the plurality of received control signals to the removed at least one module to apply a second control algorithm thereto, the second control algorithm selected from the plurality of control algorithms to power a second load.

20. The method of claim 10, wherein determining an imbalance exists between the respective outputs of the selected modules comprises:

determining that a first operating temperature of a first selected module is greater than a second operating temperature of a second selected module.

* * * * *